(12) United States Patent
Rhodes

(10) Patent No.: US 8,224,759 B2
(45) Date of Patent: Jul. 17, 2012

(54) REGULATING ACTIVATION THRESHOLD LEVELS IN A SIMULATED NEURAL CIRCUIT

(75) Inventor: Paul A Rhodes, Palm Beach, FL (US)

(73) Assignee: Evolved Machines, Inc., West Palm Beach, FL (US)

( * ) Notice: Subject to any disclaimer, the term of this patent is extended or adjusted under 35 U.S.C. 154(b) by 1019 days.

(21) Appl. No.: 12/113,868

(22) Filed: May 1, 2008

(65) Prior Publication Data

US 2009/0006060 A1 Jan. 1, 2009

Related U.S. Application Data

(60) Provisional application No. 60/927,481, filed on May 1, 2007, provisional application No. 60/915,822, filed on May 3, 2007.

(51) Int. Cl.
*G06E 1/00* (2006.01)
*G06E 3/00* (2006.01)
*G06F 15/18* (2006.01)
*G06G 7/00* (2006.01)
*G06N 3/04* (2006.01)

(52) U.S. Cl. .......................................... 706/27; 706/26
(58) Field of Classification Search .................... 706/15, 706/26, 27
See application file for complete search history.

(56) References Cited

PUBLICATIONS

A. Polsky, B. Mel, and J. Schiller, "Computational Subunits in Thin Dendrites of Pyramidal Cells", Nature Neuroscience, vol. 7, No. 6, Jun. 2004, pp. 621-627.*
N. Spruston and W. Kath, "Dendritic Arithmetic", Nature Neuroscience, vol. 7, No. 6, Jun. 2004, pp. 567-569.*
H. Zhao, "Instance Weighting versus Threshold Adjusting for Cost-Sensitive Classification", Know. Inf. Syst., vol. 15, pp. 321-334, published online Apr. 3, 2007.*

* cited by examiner

*Primary Examiner* — Jeffrey A Gaffin
*Assistant Examiner* — Vincent Gonzales
(74) *Attorney, Agent, or Firm* — Fish & Richardson P.C.

(57) ABSTRACT

A simulated neural element includes a cell body and one or more simulated branches. Simulated branches are configured to receive input signals and to activate when a combination of the signals received during a specified window of time exceeds a branch activation threshold level. The simulated cell body is configured to activate when a combination of activity in the simulated branches during another specified window of time exceeds a cell body activation threshold level. The branch and cell body activation threshold levels may be automatically and locally regulated so that the actual branch activation rates for the simulated branches approximate desired branch activation rates and the actual cell body activation rate for the simulated cell body approximates a desired cell body activation rate. Such "homeostatic" regulation of branch and cell firing thresholds, done locally (i.e. individually for each branch and cell), may enhance the performance of artificial neural circuitry.

28 Claims, 22 Drawing Sheets

REGULATING ACTIVATION THRESHOLD LEVELS IN A SIMULATED NEURAL CIRCUIT

CROSS-REFERENCE TO RELATED APPLICATIONS

This application claims priority to U.S. Provisional Application No. 60/927,481, which was filed May 1, 2007, and is titled "SENSORY EVENT RECODING AND DECODING," and U.S. Provisional Application No. 60/915,822, which was filed May 3, 2007, and is titled "SENSORY EVENT RECODING AND DECODING." These applications are incorporated by reference.

TECHNICAL FIELD

This disclosure relates to the operation of simulated neural circuits in response to sensory events.

BACKGROUND

Attempts have been made to create simulated neural circuits that include properties of biological neural circuits.

Biological neural circuits are made up of an incredibly dense meshwork of numerous, complex, tree-like units called "neurons." Each neuron can make thousands of connections with other neurons. It is at these connections or "synapses" that information is transferred between the neurons.

A biological neural circuit may be exposed to sensory events. For example, an olfactory neural circuit may be exposed to an odorant, or a visual neural circuit may be exposed to an object. Exposure to a sensory event may result in activation of certain branches of the neurons within a certain period of time, and activation of one or more branches of a particular neuron within a certain period of time may result in activation of the particular neuron.

SUMMARY

A simulated neural circuit may include one or more arrays of simulated branched neural elements having branched trees for receiving input signals. Whether branches of the trees activate in response to input signals, and whether neural elements activate in response to activation of associated branches, may be determined by threshold activation levels associated with the branches and the neural elements. Homeostatic adjustment of these threshold activation levels may be employed to improve performance of the simulated neural circuit. As one example of such adjustment, the threshold activation levels required to activate the branches and the simulated neural elements may be adjusted such that individual branches and individual simulated neural elements activate, on average, in response to a certain percentage of input sensory events.

More generally, thresholds associated with the neural circuit, a particular neural element, or a particular branch may be adjusted to control a level of activity in the inputs to a branch that cause the branch to activate, and a level of activity in the branches of a neural element that cause the neural element to activate. For example, if the level of activity is below a desired level, the thresholds may be reduced in order to increase the level of activity.

These branched neural elements, which are typically activated in response to a threshold level of activity in their associated branches, which are themselves typically activated in response to a threshold level of activity in their associated inputs, should be contrasted with the nodes of typical neural networks.

Particular aspects of the general concepts of adjusting activation thresholds in simulated neural circuits are described below.

In one aspect, a simulated neural element includes at least two branches and a simulated cell body. Each branch is configured to receive one or more input signals in response to sensory event occurrences and to activate in response to a combination of the input signals received during a first specified window of time exceeding a branch activation threshold level required to activate the branch. The simulated cell body is configured to activate in response to a combination of activity in the branches during a second specified window of time exceeding a cell body activation threshold level. In addition, the simulated neural element is configured to regulate the branch activation threshold levels such that some measures of the actual branch activation rates for the branches approximate desired branch activation rate measures. The simulated neural element also is configured to regulate the cell body activation threshold level such that some measure of the actual cell body activation rate for the simulated cell body approximates a desired cell body activation rate measure.

Implementations may include one or more of the following features. For example, the measure of the actual branch activation rate for a branch may be a measure of branch activation frequency relative to a total number of sensory event occurrences during some preceding time period. Similarly, the measure of the actual cell body activation rate may be a measure of cell body activation frequency relative to a total number of sensory event occurrences during some preceding time period. In addition, the branches may be configured to regulate their branch activation threshold levels and the simulated cell body may be configured to regulate the cell body activation threshold level.

In some implementations, the desired branch activation rate measures may be the same for all of the branches, while, in other implementations, the desired branch activation rate measures may vary for the branches.

Furthermore, the simulated neural element may be configured to increase a branch's branch activation threshold level when the measure of the branch's actual branch activation rate is greater than the branch's desired branch activation rate. Similarly, the simulated neural element may be configured to decrease a branch's branch activation threshold level when the measure of the branch's actual branch activation rate is less than the branch's desired branch activation rate.

Additionally or alternatively, the simulated neural element may be configured to increase the cell body activation threshold level when the measure of the actual cell body activation rate is greater than the desired cell body activation rate, and decrease the cell body activation threshold level when the measure of the actual cell body activation rate is less than the desired branch activation rate. In some such implementations, the cell body activation threshold level may be a threshold number of activated branches required to activate the cell body, and the simulated cell body may be configured to activate in response to a number of activated branches of the simulated neural element during the second specified window of time exceeding the threshold number of activated branches required to activate the cell body. In addition, the simulated neural element may be configured to increase the threshold number of activated branches required to activate the cell body when the measure of the actual cell body activation rate is greater than the desired cell body activation rate, and to decrease the threshold number of activated branches required to activate the cell body when the measure of the actual cell body activation rate is less than the desired branch activation rate.

In some implementations, each branch may be coupled to a plurality of inputs and each branch may be configured to receive input signals from the inputs to which it is coupled. In addition, each branch may be further configured to activate when some combination of concurrently received input signals from the inputs to which the branch is coupled exceeds the branch's branch activation threshold level. For example, in some such implementations, each branch may be configured to activate when a non-linear combination of the input signals received during the first specified window of time exceeds the branch's branch activation threshold level. In other such implementations, the input signals received from the inputs may be binary, and each branch may be configured to activate when a weighted sum of the binary input signals received during the first specified window of time exceeds the branch's branch activation threshold level. Alternatively, the input signals received from the inputs may reflect levels of activity, and each branch may be configured to activate when a sum, for example, a linear or a weighted sum, of the input signals received during the first specified window of time exceeds the branch's branch activation threshold level.

In some implementations, the cell body activation threshold level may be a threshold number of activated branches required to activate the cell body, and the cell body may be configured to activate in response to a number of activated branches of the simulated neural element during the second specified window of time exceeding the threshold number of activated branches required to activate the cell body.

In another aspect, activity levels in a simulated branched neural element of a simulated neural circuit are regulated. The simulated branched neural element includes at least two branches and a simulated cell body. Each branch is configured to receive indications of input activity levels and to activate in response to combinations of the input activity levels exceeding a branch activation threshold level. Similarly, the simulated cell body is configured to activate in response to combinations of activity in the branches exceeding a cell body activation threshold level. Desired activity rates are established for the branches and the simulated cell body. Thereafter, the actual activity rates of the branches and the simulated cell body are monitored. In addition, the branch activation threshold levels are regulated such that the actual activity rates of the branches approximate the desired activity rates for the branches, and the cell body activation threshold level is regulated such that the actual activity rate of the simulated cell body approximates the desired activity rate for the simulated cell body.

Implementations may include one or more of the following features. For example, a branch's branch activation threshold level may be regulated by increasing the branch's branch activation threshold level when the branch's actual activity rate is greater than the branch's desired activity rate and decreasing the branch's branch activation threshold level when the branch's actual activity rate is less than the branch's desired activity rate. Similarly, the cell body activation threshold level may be regulated by increasing the simulated cell body's activation threshold level when the simulated cell body's actual activity rate is greater than the desired activity rate for the simulated cell body and decreasing the simulated cell body's activation threshold level when the simulated cell body's actual activity rate is less than the desired activity rate for the simulated cell body.

In some implementations, the cell body activation threshold level may be a number of activated branches required to activate the simulated cell body such that the simulated cell body is configured to activate in response to a number of the simulated branched neural element's branches that are activated during a specified window of time exceeding the number of activated branches required to activate the simulated cell body. In such implementations, the cell body activation threshold level may be regulated by increasing the number of activated branches required to activate the simulated cell body when the simulated cell body's actual activity rate is greater than the desired activity rate for the simulated cell body, and decreasing the number of activated branches required to activate the simulated cell body when the simulated cell body's actual activity rate is less than the desired activity rate for the simulated cell body.

The actual activity rates of the branches may be monitored by averaging activity in the branches during a window in time, and the actual activity rate of the simulated cell body may be monitored by averaging activity in the simulated cell body during a window in time. In some implementations, averaging activity in the branches during a window in time may include weighting activity based on its recency relative to the window in time. Similarly, averaging activity in the simulated cell body during a window in time may include weighting activity based on its recency relative to the window in time.

Implementations of any of the techniques described may include a method or process, an apparatus or system, or a computer program embodied on a tangible computer-readable medium. The details of one or more implementations are set forth in the accompanying drawings and the description below.

DESCRIPTION OF DRAWINGS

FIG. 4 is a screenshot of a control screen for a computer-implemented sensory event identification system.

FIG. 8c is a close-up of a simulated neuron of the block diagram of FIG. 8a.

FIGS. 9a and 9b are additional screenshots of the control screen for the computer-implemented sensory event identification system.

DETAILED DESCRIPTION

Figure 1A:
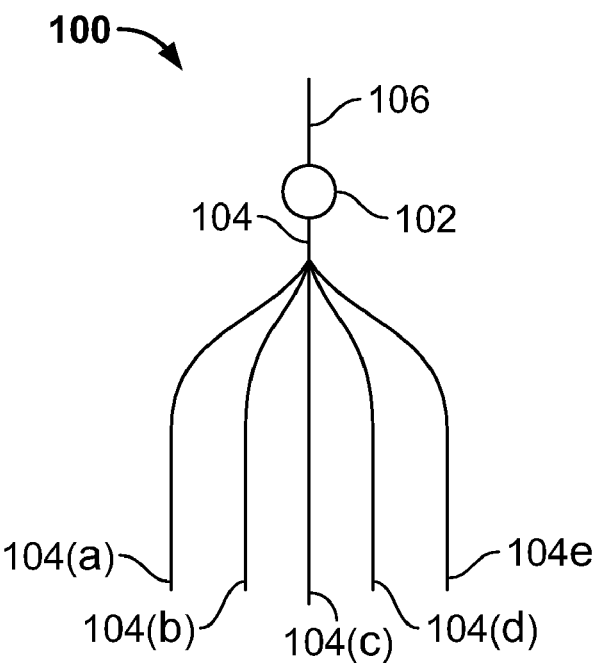
FIGS. 1a and 1b are block diagrams of an example of a simulated neuron.

Sensory events generated in response to exposure to different objects may be characterized by the activity of a set of different sensory features. Often, however, there may be considerable overlap between the sensory features that characterize different sensory events, even though the associated objects have very different meaning. For example, a fresh apple and a spoiled apple emit odorants that exhibit very similar molecular structures. Nevertheless, these odorants represent two very different objects, and it is important to be able to distinguish between the two. In an object recognition system such as is described below, the representation of distinct objects which activate overlapping sensor patterns are recoded into a new representation in which accurate recognition may be more successfully accomplished.

In some implementations, simulated neural circuitry is used to recode the raw sensor representations of sensory events (e.g., objects) into combinations of higher order features that signify the joint presence of sets of primary sensory features. In such implementations, the simulated neural circuitry may be modeled after real neurons, which may be described as electrically active tree structures. The recoded representations of sensory events generated using such simulated neural circuitry may not exhibit as much overlap as the original representations of the sensory events, and, as a result, the recoded representations may be easier to discriminate from one another. Consequently, using simulated neural circuitry to recode representations of sensory events that are based on the sensory features that characterize the sensory events may improve the performance of systems that are designed to recognize different sensory events.

In one particular implementation, a sensory event detection system includes sensors for detecting sensory features related to a class of sensory events. When a sensory event occurs, the sensors detect the sensory features that characterize the sensory event and generate a collection of sensory feature signals based on the sensory features detected in connection with the sensory event. The sensory feature signals, representing the sensory features detected in connection with the sensory event, are then input to simulated neural circuitry, with the pattern of active and inactive simulated neurons that ultimately results from inputting the sensory feature signals to the simulated neural circuitry representing a recoding of the original representation of the sensory event that was generated by the sensory feature sensors. The recoded pattern of active and inactive neurons can thereafter be decoded in order to identify the particular sensory event that occurred.

The simulated neural circuitry may include one or more arrays of simulated branched neural elements having branched trees for receiving input signals. Input sensory feature signals may be transmitted to the simulated neural circuitry by a collection of simulated sensory fibers (e.g., sensor inputs) that impinge, or otherwise are coupled to, the branches of the simulated neural elements. Different subsets of simulated sensory fibers impinge different branches of the simulated neural elements, and individual branches are configured to activate when some combination of the input sensory feature signals transmitted to the branches by the impinging simulated sensory fibers during a specified window of time exceed branch activation threshold values. Because individual branches are configured to activate in response to concurrent activity in a subset of simulated sensory fibers, individual branches may function to recognize the joint presence of a particular collection of sensory features in an input sensory event. Stated differently, the branches may be said to function as recoding the sensory features of an input sensory event into a pattern of higher order features of the sensory features of the input sensory event.

Much like the branches, individual simulated neural elements are configured to activate when some combination of the activity levels in the branches of the individual simulated neural elements during a specified window of time exceed neural element activation threshold values. As such, individual simulated neural elements may function to recognize that a number of the higher order features of the pattern of activity generated in the branches are themselves jointly present. The pattern of activity ultimately generated in the simulated neural elements may represent an even higher order recoding of the sensory features of the input sensory event.

Such recoding of input sensory events based on the identification of higher order features of the sensory features that characterize the input sensory events may serve to reduce sensory feature overlap between sensory events characterized by similar sensory features thereby resulting in representations of sensory events that may be discriminated and recognized more easily and more accurately.

The efficacy of this recoding may be enhanced by the homeostatic adjustment of the threshold activation levels required to activate the branches and simulated neural elements. As one example of such an adjustment scheme, the threshold activation levels required to activate the branches and the simulated neural elements may be adjusted such that individual branches and individual simulated neural elements activate, on average, in response to a certain percentage of input sensory events.

Figure 1B:
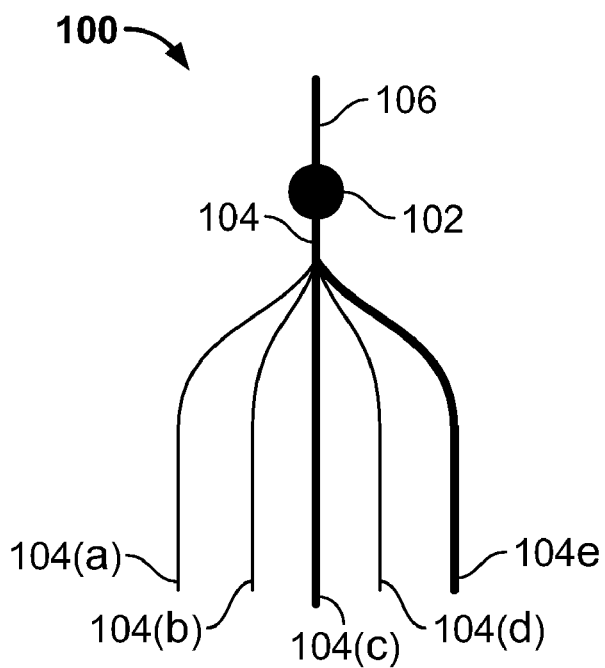

FIGS. 1a and 1b are block diagrams of an example of a simulated neuron 100 that may be used in conjunction with one or more other simulated neurons to generate a simulated neural recoder for recoding representations of sensory events. Referring to FIG. 1a, the simulated neuron 100 includes a cell body 102, or soma, a dendritic tree 104 having branches 104(a), 104(b), 104(c), 104(d), and 104(e), and an output 106.

At a high level, branches 104(a), 104(b), 104(c), 104(d), and 104(e) may be considered inputs to the cell body 102, and output 106 may be considered an output of the cell body 102.

More particularly, an occurrence of a sensory event may trigger activity in one or more of branches 104(a), 104(b), 104(c), 104(d), and 104(e). In turn, activity in one or more of branches 104(a), 104(b), 104(c), 104(d), and 104(e) may cause cell body 102 to fire, thereby resulting in the generation of an output signal on output 106.

In some implementations, activity in the input branches 104(a), 104(b), 104(c), 104(d), and 104(e) may be binary. That is to say, activity in a particular branch may indicate simply that the branch is active (or inactive). In such implementations, cell body 102 may fire in response to a threshold number of the input branches 104(a), 104(b), 104(c), 104(d), and 104(e) being active concurrently (e.g., within a specified window of time).

Alternatively, in other implementations, activity in the input branches 104(a), 104(b), 104(c), 104(d), and 104(e) may carry more significance than simply signaling that particular input branches are active (or inactive). That is to say, the actual magnitude of the activity levels in the input branches 104(a), 104(b), 104(c), 104(d), and 104(e) may be significant. In such implementations, cell body 102 may fire when some combination of the concurrent activity levels in the input branches 104(a), 104(b), 104(c), 104(d), and 104(e) exceeds a threshold activity level and/or in response to a threshold number of the input branches 104(a), 104(b), 104(c), 104(d), and 104(e) being active concurrently. For example, the cell body 102 may fire in response to a weighted or un-weighted sum of the concurrent activity levels in the input branches 104(a), 104(b), 104(c), 104(d), and 104(e) exceeding a threshold activity level. Additionally or alternatively, the cell body 102 may fire in response to a non-linear combination of the concurrent activity levels in the input branches 104(a), 104(b), 104(c), 104(d), and 104(e) exceeding a threshold activity level.

The input branches 104(a), 104(b), 104(c), 104(d), and 104(e) may respond differently to different sensory events. That is to say, different input branches 104(a), 104(b), 104(c), 104(d), and 104(e) may be triggered by different sensory events and/or different activity levels may be generated in different input branches 104(a), 104(b), 104(c), 104(d), and 104(e) in response to different sensory events. Consequently, some sensory events may trigger the simulated neuron 100 to fire while other sensory events may not.

FIG. 1b illustrates an example of activity in the input branches 104(c) and 104(e) that cause cell body 102 to fire, thereby generating an output signal along output 106. (Activity in the input branches 104(c) and 104(e) is depicted through the use of bold shading, the firing of cell body 102 is depicted through the use of a solid triangle, as opposed to the hollow triangle used to represent the inactive cell body 102 of FIG. 1a, and activity on output 106 is depicted through the use of bold shading.) As illustrated in FIG. 1b, concurrent activity in input branches 104(c) and 104(e) causes cell body 102 to fire, thereby generating an output signal along output 106.

As discussed above, in some implementations, concurrent activity in a threshold number of branches of a simulated neuron may cause the cell body of the simulated neuron to fire. For example, as illustrated in FIG. 1b, concurrent activity in two branches (i.e., branches 104(c) and 104(e)) may cause cell body 102 to fire. Alternatively, and as also discussed above, in other implementations, the cell body of a simulated neuron may fire in response to a combination of the concurrent activity levels in the input branches 104(a), 104(b), 104(c), 104(d), and 104(e) exceeding a threshold activity level. For example, as illustrated in FIG. 1b, a weighted or un-weighted sum of the activity levels in input branches 104(c) and 104(e) may exceed a threshold activity level, thereby causing cell body 102 to fire in response.

The threshold level of branch activity that is required to trigger the cell body of a simulated neuron to fire may be either a static parameter or a modifiable parameter capable of being updated manually and/or dynamically (e.g., without user intervention). In some implementations, it may be desirable for the cell body of a simulated neuron to fire in response to a certain percentage of input sensory events. For example, it may be determined that it is desirable for the cell body of a simulated neuron to fire in response to 25% of the sensory events to which the simulated neuron is exposed. Therefore, the threshold level of branch activity that is required to trigger the cell body of a particular simulated neuron to fire may be monitored and updated, over time, as the simulated neuron is exposed to different sensory events, such that the simulated neuron fires in response to approximately 25% of the sensory events to which it is exposed. For instance, if it is determined that, on average, the cell body is firing in response to less than 25% of the sensory events to which the simulated neuron is exposed, the threshold level of branch activity that is required to trigger the cell body to fire may be decreased. Similarly, if it is determined that, on average, the cell body is firing in response to more than 25% of the sensory events to which the simulated neuron is exposed, the threshold level of branch activity that is required to trigger the cell body to fire may be increased.

The simulated neuron 100 of FIGS. 1a and 1b is merely one example of a simulated neuron that may be used in conjunction with one or more other simulated neurons to generate a simulated neural recoder for recoding representations of sensory events. However, simulated neurons that differ in structure from the simulated neuron 100 of FIGS. 1a and 1b also can be used to construct simulated neural recoders. For example, the simulated neuron 100 illustrated in FIGS. 1a and 1b has a dendritic tree 104 with five branches 104(a), 104(b), 104(c), 104(d), and 104(e). However, simulated neurons may have branched trees with more than five or less than five branches. In addition, the branches 104(a), 104(b), 104(c), 104(d), and 104(e) of the dendritic tree 104 of simulated neuron 100 illustrated in FIGS. 1a and 1b do not have sub-branches. However, simulated neurons may have branched trees with branches that themselves branch one or more times, resulting in much more elaborate hierarchical tree structures than the dendritic tree 104 illustrated in FIGS. 1a and 1b.

FIGS. 2a-2d are block diagrams of a simulated neural recoder 200 constructed from an array 202 of simulated neurons 202(1)-202(n) for recoding representations of sensory events based on the sensory features that describe the sensory events into patterns of active and inactive neurons. As illustrated in FIGS. 2a-2d, simulated neural recoder 200 includes an array 202 of simulated neurons 202(1)-202(n) and an array 204 of simulated sensory fibers (e.g., sensor inputs) 204(1)-204(m). As illustrated in FIGS. 2a-2d, each of the individual neurons 202(1)-202(n) includes a dendritic tree having input branches. For example, simulated neuron 202(1) includes input branches 202(1)(a), 202(1)(b), 202(1)(c), 202(1)(d), and 202(1)(e). Similarly, simulated neuron 202(2) includes input branches 202(2)(a), 202(2)(b), 202(2)(c), 202(2)(d), and 202(2)(e) and simulated neuron 202(n) includes input branches 202(n)(a), 202(n)(b), 202(n)(c), 202(n)(d), and 202(n)(e).

Individual simulated sensory fibers impinge various input branches of the simulated neurons such that activity on the simulated sensory fibers may be transmitted to the input branches. (Such connections are depicted in FIGS. 2a-2d by darkened circles 206 at intersections of simulated sensory fibers and input branches.) For example, simulated sensory fiber 204(1) impinges input branches 202(1)(a), 202(2)(c), and 202(n)(a), simulated sensory fiber 204(m−3) impinges input branches 202(1)(e), 202(2)(c), and 202(n)(e), and simulated sensory fiber 204(m) impinges input branches 202(1)(a), 202(2)(d), and 202(n)(e).

Representations of sensory events are input to the simulated neural recoder 200 by the array 204 of simulated sensory fibers 204(1)-204(m). More particularly, each individual simulated sensory fiber corresponds to one or more sensory features and representations of particular sensory events are input to the simulated neural recoder 200 by activating the simulated sensory fibers that correspond to the sensory features that characterize the particular sensory events. In some implementations, activating sensory fibers may involve generating signals on the simulated sensory fibers that indicate merely that the sensory fibers are active. In other words, the signals on the simulated sensory fibers may indicate the presence of the sensory features and nothing more. In other implementations, activating sensory fibers may involve generating more nuanced signals on the simulated sensory fibers that carry more significance than merely indicating that the simulated sensory fibers are active (i.e., that the sensory features are present). For example, signals may be generated on the simulated sensory fibers such that the magnitudes of the signals are proportional to, or otherwise indicative of, the strength of the sensory features detected in connection with a sensory event.

In some implementations, the representations of sensory events input to the simulated neural recoder are generated by sensors configured to detect sensory features related to a class of sensory events. More particularly, sensors configured to detect particular sensory features related to the class of sensory events are associated with individual simulated sensory fibers of the simulated neural recoder 200 that correspond to the sensory features that the sensors are configured to detect. When a sensory event occurs, the sensors detect the sensory features that characterize the sensory event and activate the corresponding simulated sensory fibers.

In one particular example, olfactory sensors are configured to detect the presence of different olfactory features. When an odorant is exposed to the olfactory sensors, the particular olfactory features that are present in the odorant are detected by the olfactory sensors and communicated to the simulated neural recoder 200 by activating the simulated sensory fibers that correspond to the detected olfactory features.

Figure 2A:
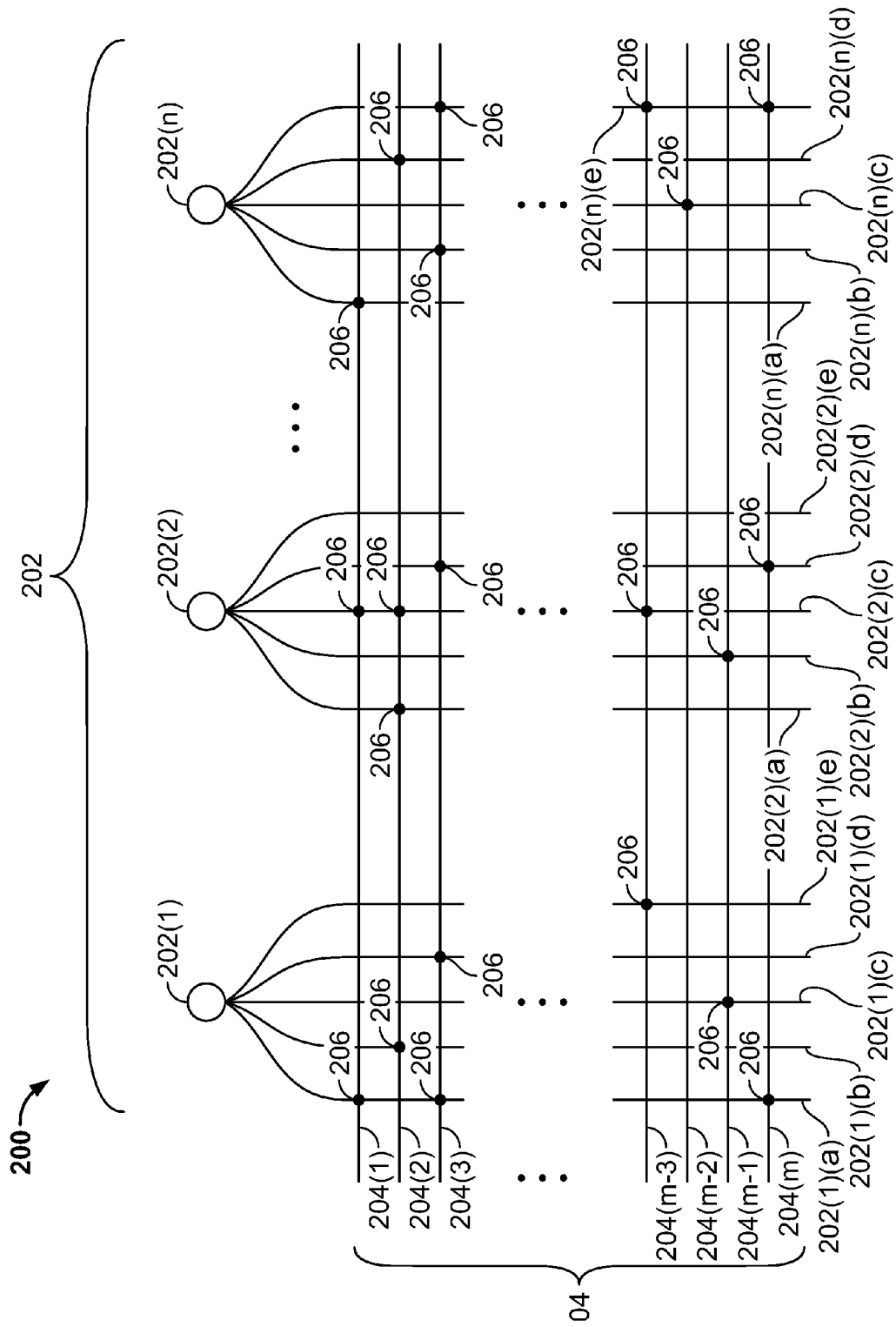
FIGS. 2a-2d are block diagrams of a simulated neural recoder.
Figure 2B:
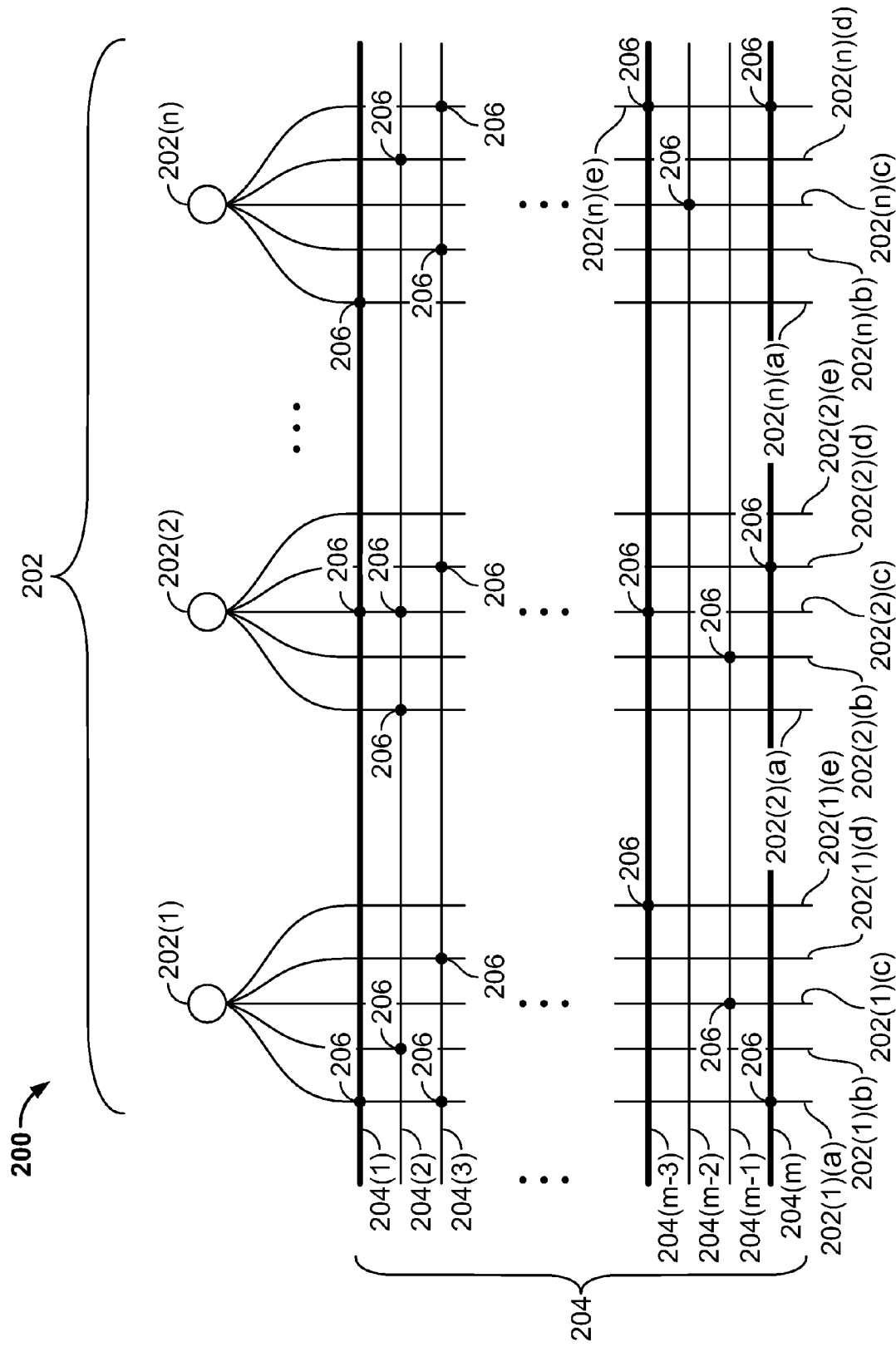
Figure 2C:
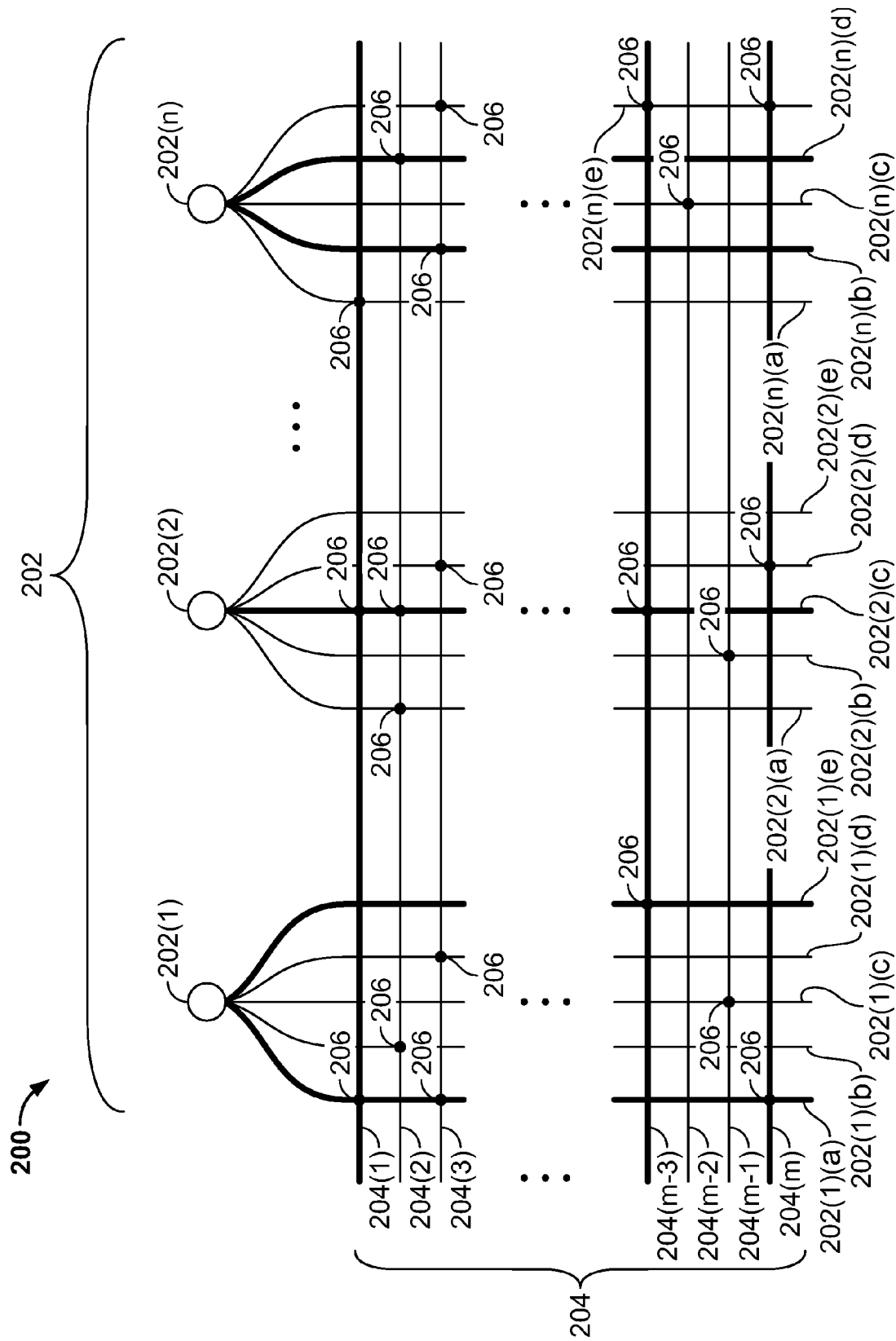
Figure 2D:
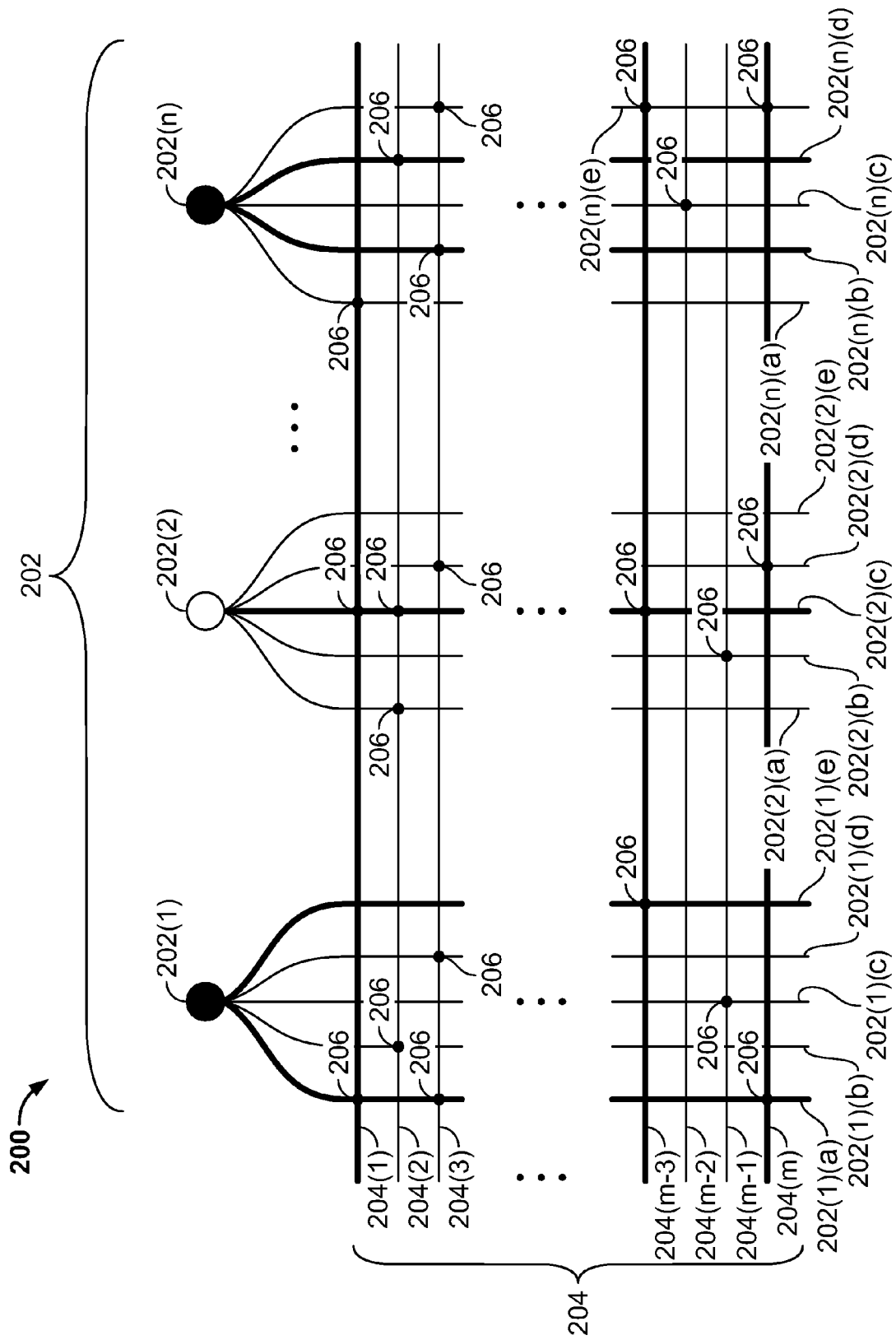

The sensory feature signals representing sensory events that are input to the simulated neural recoder 200 via the array 204 of simulated sensory fibers 204(1)-204(m) propagate through the simulated neural recoder 200, ultimately resulting in a recoding of the input sensory feature signals into a pattern of active and inactive simulated neurons. FIGS. 2b-2d illustrate how input sensory feature signals representing sensory events propagate through the simulated neural recoder 200 and result in a recoding of the input sensory signals into a pattern of active and inactive simulated neurons.

FIG. 2b illustrates a representation of a sensory event being input to the simulated neural recoder 200 via the array 204 of simulated sensory fibers 204(1)-204(m). (Activity in individual simulated sensory fibers is depicted in FIG. 2b through the use of bold shading.) As discussed above, the representation of the sensory event is input to the simulated neural recoder 200 by activating the individual simulated sensory fibers that correspond to the sensory features that characterize the sensory event. In other words, the representation of the sensory event is input to the simulated neural recoder 200 by generating sensory feature signals on the individual simulated sensory fibers that correspond to the sensory features that characterize the sensory event. As illustrated in FIG. 2b, sensory feature signals have been generated on simulated sensory fibers 204(1), 204(m−3), and 204(m) in response to the sensory event.

As the input sensory feature signals propagate along simulated sensory fibers 204(1), 204(m−3), and 204(m), the input sensory feature signals are communicated to the input branches of the array 202 of neurons 202(1)-202(n) that are impinged by the simulated sensory fibers 204(1), 204(m−3), and 204(m). More particularly, the input sensory feature signal carried by simulated sensory fiber 204(1) is communicated to input branches 202(1)(a), 202(2)(c), and 202(n)(a), the input sensory feature signal carried by simulated sensory fiber 204(m−3) is communicated to input branches 202(1)(e), 202(2)(c), and 202(n)(e), and the input sensory feature signal carried by simulated sensory fiber 204(m) is communicated to input branches 202(1)(a), 202(2)(d), and 202(n)(e).

The input branches of the neuronal array 202 are responsive to activity in the simulated sensory fibers that impinge the input branches and may be triggered by combinations of concurrent activity in the simulated sensory fibers that impinge the input branches. For example, a particular input branch may be triggered when a threshold number of the simulated sensory fibers that impinge the particular input branch are activated concurrently (e.g., within a specified window of time). Alternatively, a particular input branch may be triggered when a sum of the concurrent activity levels in the simulated sensory fibers that impinge the particular branch exceeds a threshold activity level. In such implementations, the connections between the particular input branch and the simulated sensory fibers that impinge the branch may be weighted, and the particular input branch may be triggered when a weighted sum of the concurrent activity levels in the simulated sensory fibers that impinge the particular branch exceeds a threshold activity level. In another example, a particular input branch may be triggered by one or more non-linear combinations of concurrent activity in the simulated sensory fibers that impinge the particular input branch.

FIG. 2c illustrates activation of input branches of the neuronal array 202 in response to inputting the representation of the sensory event to the simulated neural recoder 200 via the array 204 of simulated sensory fibers 204(1)-204(m). (Activity in individual input branches is depicted in FIG. 2c through the use of bold shading.) As illustrated in FIG. 2c, input branches 202(1)(a) and 202(1)(e) of neuron 202(1), input branch 202(2)(c) of neuron 202(2), and input branches 202(n)(b) and 202(n)(d) of neuron 202(n) have been activated in response to inputting the representation of the sensory event to the simulated neural recoder 200 via the array 204 of simulated sensory fibers 204(1)-204(m).

As discussed above, each activated input branch has been activated in response to the combination of concurrent activity in the simulated sensory fibers that impinge the activated input branch. For example, input branch 202(1)(a) may have been activated in response to a sufficient level of concurrent activity in the simulated sensory fibers that impinge input branch 202(1)(a). That is to say, input branch 202(1)(a) may have been activated in response to a sufficient level of concurrent activity in simulated sensory fibers 204(1), 204(3), 204(m), and any other simulated sensory fibers that impinge input branch 202(1)(a) but that are not illustrated in FIG. 2c. Similarly, input branch 202(1)(e) may have been activated in response to a sufficient level of concurrent activity in simulated sensory fiber 204(m−3) and any other simulated sensory fibers that impinge input branch 202(1)(e) but that are not illustrated in FIG. 2c; input branch 202(2)(c) may have been activated in response to a sufficient level of concurrent activity in simulated sensory fibers 204(1), 204(2), 204(m–3), and any other simulated sensory fibers that impinge input branch 202(2)(c) but that are not illustrated in FIG. 2c; input branch 202(n)(b) may have been activated in response to a sufficient level of concurrent activity in simulated sensory fiber 204(3) and any other simulated sensory fibers that impinge input branch 202(n)(b) but that are not illustrated in FIG. 2c; and input branch 202(n)(d) may have been activated in response to a sufficient level of concurrent activity in simulated sensory fiber 204(2) and any other simulated sensory fibers that impinge input branch 202(2)(c) but that are not illustrated in FIG. 2c.

The firing of an input branch in response to inputting the representation of the sensory event to the simulated neural recoder 200 via the array 204 of simulated sensory fibers 204(1)-204(m) may signify an identification of a higher order feature of the sensory event. Stated differently, the firing of an input branch in response to inputting the representation of the sensory event to the neural recoder 200 via the array 204 of simulated sensory fibers 204(1)-204(m) may signify the joint presence of a set of features in the sensory event.

As discussed above in connection with FIGS. 1a and 1b, simulated neurons may fire in response to combinations of concurrent activity in their branched trees. Consequently, one or more of the individual simulated neurons 202(1)-202(n) of the simulated neural array 202 may fire in response to the activity in the input branches generated in response to inputting the representation of the sensory event to the simulated neural recoder 200 via the array 204 of simulated sensory fibers 204(1)-204(m).

FIG. 2d illustrates the firing of individual neurons in response to the activity in the input branches generated in response to inputting the representation of the sensory event to the simulated neural recoder 200 via the array 204 of simulated sensory fibers 204(1)-204(m). (Active neurons are depicted in FIG. 2d by solid triangles, whereas inactive neurons are depicted as hollow triangles.) As illustrated in FIG. 2d, individual neurons 202(1) and 202(n) fired in response to the activity in the input branches generated in response to inputting the representation of the sensory event to the simulated neural recoder 200 via the array 204 of simulated sensory fibers 204(1)-204(m). That is to say, the combination of concurrent activity in input branches 202(1)(a) and 202(1)(e) generated in response to inputting the representation of the sensory event to the neural recoder 200 via the array 204 of simulated sensory fibers 204(1)-204(m) triggered the firing of simulated neuron 202(1) and the combination of concurrent activity in input branches 202(n)(b) and 202(n)(d) generated in response to inputting the representation of the sensory event to the simulated neural recoder 200 via the array 204 of simulated sensory fibers 204(1)-204(m) triggered the firing of simulated neuron 202(n). The pattern of active and inactive simulated neurons generated in response to inputting the representation of the sensory event to the simulated neural recoder 200 represents a recoding of the representation of the sensory event. That is to say, the simulated neural recoder 200 recodes the input sensory feature signals representing the sensory features that characterize the sensory event into a pattern of active and inactive simulated neurons.

The simulated neural recoder 200 illustrated in FIGS. 2a-2d is merely one example of a neural recoder. For example, multiple arrays of neurons may be cascaded, or otherwise interconnected, to form more elaborate neural recoders. For instance, outputs from a first array of simulated neurons may be connected to one or more input branches of a second array of simulated neurons to form a two-tiered simulated neuronal recoder. In addition, feedback mechanisms may be incorporated into simulated neural recoders. For example, in a single-tiered simulated neural recoder having a single array of simulated neurons, an output of a simulated neuron may be connected to one or more input branches of the array of simulated neurons. Similarly, in a multi-tiered simulated neural recoder having multiple arrays of simulated neurons, an output of a simulated neuron from a particular array of simulated neurons may be connected to one or more input branches of the particular array of simulated neurons and/or an output of the simulated neuron may be connected to one or more input branches of another array of simulated neurons that precedes the particular array of simulated neurons. Furthermore, simulated neural recoders may be constructed from simulated neurons having branched trees that include numerous branches and sub-branches.

Figure 2E:
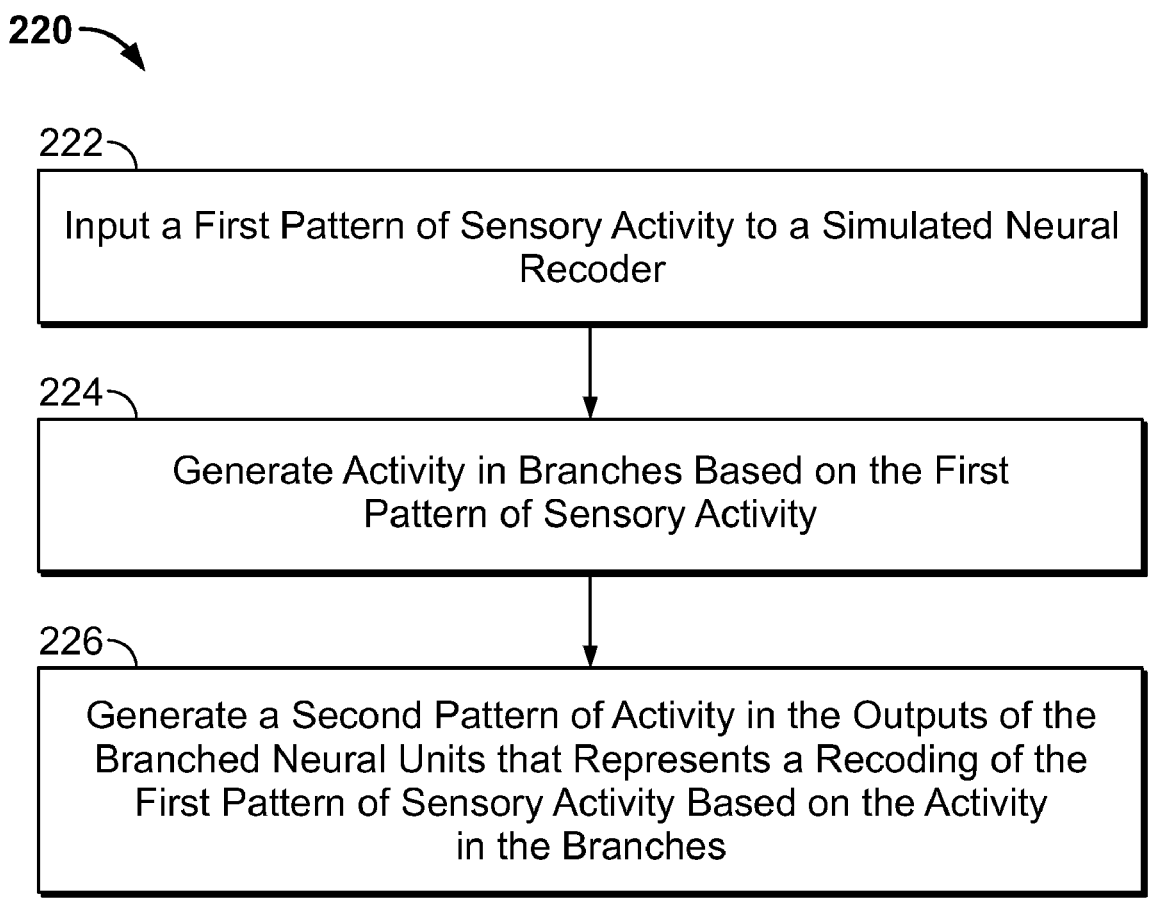
FIG. 2e is a flowchart of an example of a process for using a simulated neural recoder to recode a representation of a sensory event into a pattern of active and inactive neurons.

FIG. 2e is a flowchart of an example of a process 220 for using a simulated neural recoder to recode a representation of a sensory event into a pattern of active and inactive neurons. The process may be performed by, for example, the simulated neural recoder 200 of FIGS. 2a-2d. The process begins by inputting a first pattern of sensory activity to the simulated neural recoder (222). In some implementations, the first pattern of sensory activity may represent weighted transmissions of sensory features that characterize a sensory event. For example, the first pattern of sensory activity may represent levels of odorants detected in response to exposure to a particular object.

As discussed above in connection with FIGS. 2a-2d, the simulated neural recoder may include an array of simulated sensory fibers and an array of simulated neurons having simulated input branches that are impinged by different subsets of the array of simulated sensory fibers. In response to receiving the first pattern of sensory activity, activity is generated in the simulated input branches (224). In some implementations, activity in individual branches may be generated in response to concurrent activity in a threshold number of the simulated sensory fibers that impinge the branches and/or in response to a sum of concurrent activity in the simulated sensory fibers that impinge the branches exceeding a threshold level. Additionally or alternatively, individual branches may be modeled as non-linear elements and activity may be generated in individual branches in response to different combinations of concurrent activity in the simulated sensory fibers that impinge the branches.

The activity in the branches ultimately generates activity in the simulated neural elements that results in a second pattern of active and inactive neurons that represents a recoding of the first pattern of sensory activity (226). In some implementations, activity in individual neurons may be generated in response to concurrent activity in a threshold number of the neurons' branches and/or in response to a sum of concurrent activity in the neurons' branches exceeding a threshold level. Additionally or alternatively, individual simulated neurons may be modeled as non-linear elements and activity may be generated in individual simulated neurons in response to different combinations of concurrent activity in the neurons' branches.

Figure 3A:
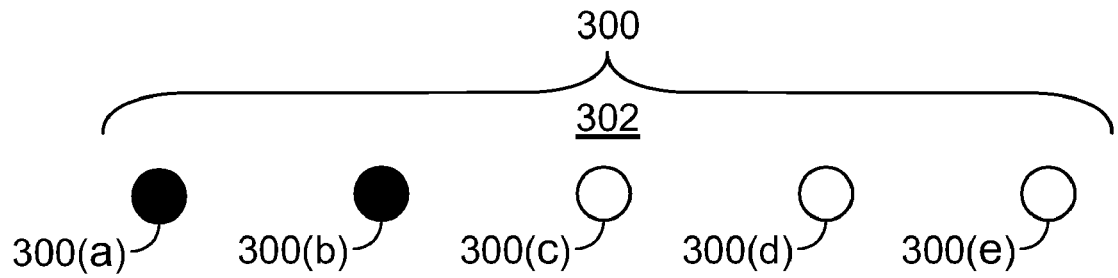
FIGS. 3a-3c are block diagrams of an example of an array of simulated neurons that illustrate different patterns of active and inactive simulated neurons.
Figure 3B:
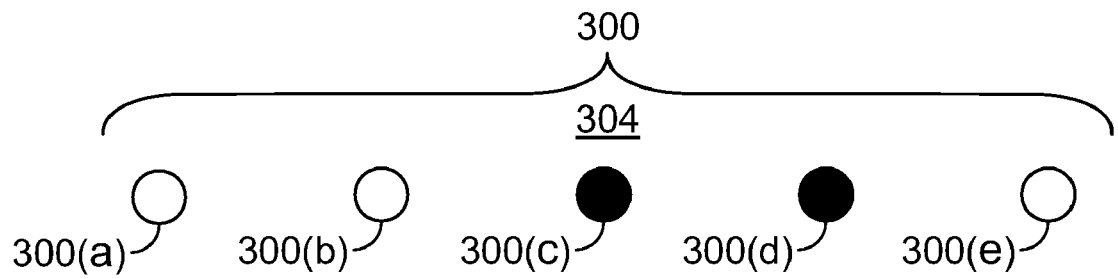
Figure 3C:
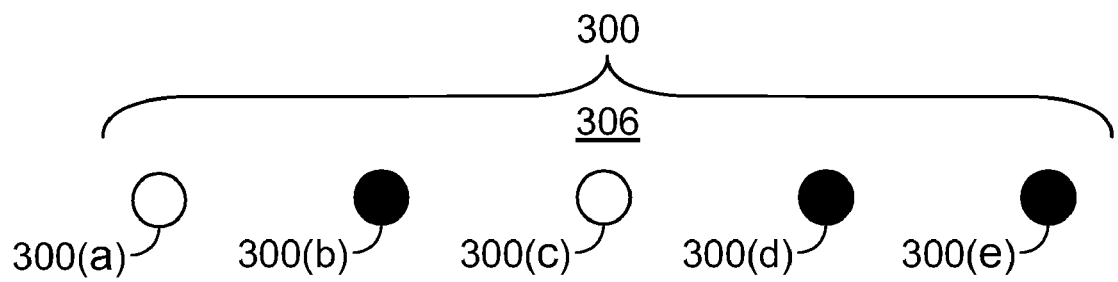

As discussed above, a simulated neural recoder can be used to recode input representations of sensory events into patterns of active and inactive simulated neurons. FIGS. 3a-3c are block diagrams of an example of an array 300 of simulated neurons 300(a), 300(b), 300(c), 300(d), and 300(e) that illustrate different patterns of active and inactive simulated neurons that represent recodings of representations of different input sensory events.

FIG. 3a illustrates a recoding of a representation of a first sensory event into a first pattern 302 of active and inactive simulated neurons in the array 300 of simulated neurons 300(a), 300(b), 300(c), 300(d), and 300(e). In particular, the representation of the first sensory event has been recoded by the array 300 of simulated neurons 300(a), 300(b), 300(c), 300(d), and 300(e) into pattern 302 in which simulated neurons 300(a) and 300(b) are active and simulated neurons 300(c), 300(d), and 300(e) are inactive.

FIG. 3b illustrates a recoding of a representation of a second sensory event into a second pattern 304 of active and inactive simulated neurons in the array 300 of simulated neurons 300(a), 300(b), 300(c), 300(d), and 300(e). In particular, the representation of the second sensory event has been recoded by the array 300 of simulated neurons 300(a), 300(b), 300(c), 300(d), and 300(e) into pattern 304 in which simulated neurons 300(c) and 300(d) are active and simulated neurons 300(a), 300(b), and 300(e) are inactive.

FIG. 3c illustrates a recoding of a representation of a third sensory event into a third pattern 306 of active and inactive simulated neurons in the array 300 of simulated neurons 300(a), 300(b), 300(c), 300(d), and 300(e). In particular, the representation of the third sensory event has been recoded by the array 300 of simulated neurons 300(a), 300(b), 300(c), 300(d), and 300(e) into pattern 306 in which simulated neurons 300(b), 300(d), and 300(e) are active and simulated neurons 300(a) and 300(c) are inactive.

While some overlap is apparent in the patterns 302, 304, and 306 of active and inactive simulated neurons illustrated in FIGS. 3a-3c, the patterns 302, 304, and 306 are unique. Consequently, the patterns 302, 304, and 306 of active and inactive neurons can be discriminated from one another and the patterns 302, 304, and 306 of active and inactive neurons can be decoded to identify the sensory events represented by the patterns 302, 304, and 306.

Figure 3D:
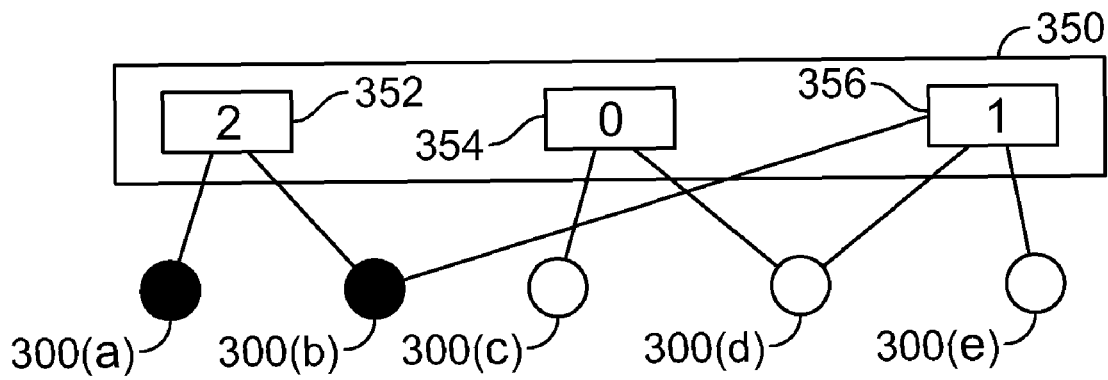
FIGS. 3d-3f are block diagrams of a decoder for decoding patterns of active and inactive simulated neurons.
Figure 3E:
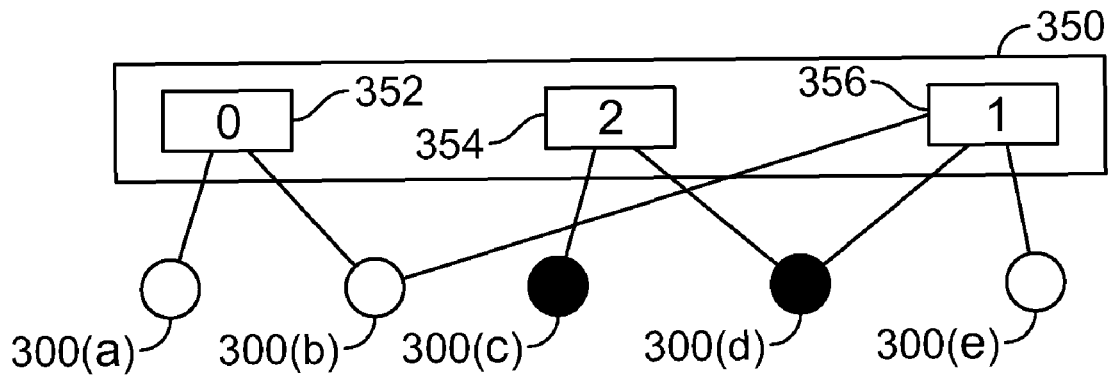
Figure 3F:
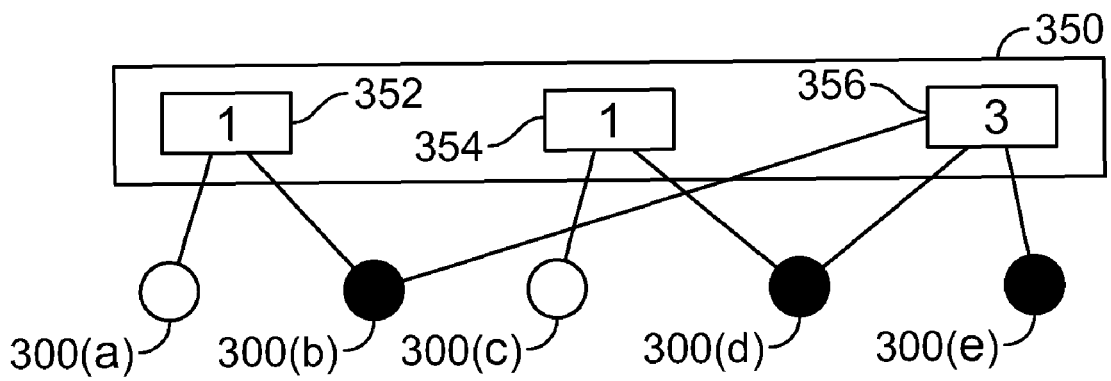

FIGS. 3d-3f are block diagrams of a decoder 350 for decoding patterns of active and inactive simulated neurons to identify sensory events represented by the patterns of active and inactive simulated neurons. In particular, FIGS. 3d-3f are block diagrams of a decoder 350 for decoding the patterns 302, 304, and 306 of active and inactive simulated neurons of FIGS. 3a-3c that illustrate how the patterns 302, 304, and 306 illustrated in FIGS. 3a-3c can be discriminated and decoded to identify the first, second, and third sensory events signified by patterns 302, 304, and 306 respectively.

As illustrated in FIGS. 3d-3f, decoder 350 includes output units (e.g., counters) 352, 354, and 356. Each of output unit 352, 354, and 356 corresponds to a known sensory event (or known category of sensory event) and is configured to identify the pattern of active and inactive simulated neurons that represent the known sensory event (or known category of sensory event) by monitoring the output of the active neurons in the pattern that represents the known sensory event.

For example, output 352 corresponds to the first sensory event and, referring to FIG. 3a, is assigned to monitor the output of simulated neurons 300(a) and 300(b), because simulated neurons 300(a) and 300(b) are known to fire in response to inputting the representation of the first sensory event into the simulated neural recoder. Similarly, output 354 corresponds to the second sensory event and, referring to FIG. 3b, is assigned to monitor the output of simulated neurons 300(c) and 300(d), because simulated neurons 300(c) and 300(d) are known to fire in response to inputting the representation of the second sensory event into the simulated neural recoder. Likewise, counter 356 corresponds to the third sensory event, and, referring to FIG. 3c, is assigned to monitor count the output of simulated neurons 300(b), 300(d), and 300(e), because simulated neurons 300(b), 300(d), and 300(e) are known to fire in response to inputting the representation of the third sensory event into the simulated neural recoder.

When a pattern of active and inactive simulated neurons is presented to the decoder 350 for decoding, outputs 352, 354, and 356 monitor and count the output of the simulated neurons to which they are assigned. Thereafter, the particular pattern presented to the decoder 350 for decoding, as well as the sensory event represented by the particular pattern presented to the decoder 350 for decoding, may be discerned by identifying the counter that registers the highest count in response to the particular pattern.

FIG. 3d illustrates how the decoder 350 can be used to decode the pattern 302 of active and inactive simulated neurons that represent the first sensory event. As illustrated in FIG. 3d, simulated neurons 300(a) and 300(b) are active and simulated neurons 300(c), 300(d), and 300(e) are inactive in pattern 302. Therefore, output 352, which is assigned to monitor and count the output of simulated neurons 300(a) and 300(b), registers a count of "2," because both simulated neurons 300(a) and 300(b) are active in pattern 302. Similarly, output 354, which is assigned to monitor and count the output of simulated neurons 300(c) and 300(d), registers a count of "0," because both simulated neurons 300(c) and 300(d) are inactive in pattern 302. Lastly, output 356, which is assigned to monitor and count the output of simulated neurons 300(b), 300(d), and 300(e), registers a count of "1," because simulated neuron 300(b) is active and simulated neurons 300(d) and 300(e) are inactive in pattern 302. Thus, output 352 registers the highest count in response to pattern 302. Consequently, because output 352 corresponds to the first sensory event, decoder 350 identifies pattern 302 as representing the first sensory event.

FIG. 3e illustrates how the decoder 350 can be used to decode the pattern 304 of active and inactive simulated neurons that represent the second sensory event. As illustrated in FIG. 3e, simulated neurons 300(c), and 300(d) are active and simulated neurons 300(a), 300(b), and 300(e) are inactive in pattern 304. Therefore, output 352 registers a count of "0," output 354 registers a count of "2," and output 356 registers a count of "1" in response to pattern 304. Consequently, because output 354 registers the highest count in response to pattern 304 and because output 354 corresponds to the second sensory event, decoder 350 identifies pattern 304 as representing the second sensory event.

FIG. 3f illustrates how the decoder 350 can be used to decode the pattern 306 of active and inactive simulated neurons that represents the third sensory event. As illustrated in FIG. 3f, simulated neurons 300(b), 300(d), and 300(e) are active and simulated neurons 300(a) and 300(c) are inactive in pattern 306. Therefore, output 352 registers a count of "1," output 354 registers a count of "1," and output 356 registers a count of "3" in response to pattern 306. Consequently, because output 356 registers the highest count in response to pattern 306 and because output 356 corresponds to the third sensory event, decoder 350 identifies pattern 306 as representing the third sensory event.

The example decoder 350 presented in FIGS. 3d-3f is merely one example of a decoder for decoding patterns of active and inactive simulated neurons to identify sensory events represented by the patterns of active and inactive simulated neurons. Accordingly, other decoders also may be used for decoding patterns of active and inactive simulated neurons.

For example, similarly to the example decoder 350 presented in FIGS. 3d-3f, a decoder may include output units that correspond to known sensory events (or known categories of sensory events) and that are connected to the outputs of the neurons known to activate in response to the sensory events (or categories of sensory events) to which the output units correspond. However, unlike the example decoder 350 presented in FIGS. 3d-3f, the connections between outputs of the neurons known to activate in response to a particular sensory event (or category of sensory event) and the output unit of the decoder that corresponds to the particular sensory event (or category of sensory event) may be weighted based on the total number of neurons known to activate in response to the particular sensory event (or category of sensory event) such that the value registered by the output unit of the decoder corresponding to the particular sensory event (or category of sensory event) is normalized to a desired value. For instance, if 15 neurons are known to activate in response to a particular sensory event (or category of sensory event), the 15 neurons known to activate in response to the particular sensory event (or category of sensory event) may be connected to the output unit of the decoder that corresponds to the particular sensory event (or category of sensory event) and each connection may be assigned a weight of $1/15$ such that when the particular sensory event (or category of sensory event) is observed, the output unit of the decoder that corresponds to the particular sensory event (or category of sensory event) registers input totaling 1.0.

Figure 3G:
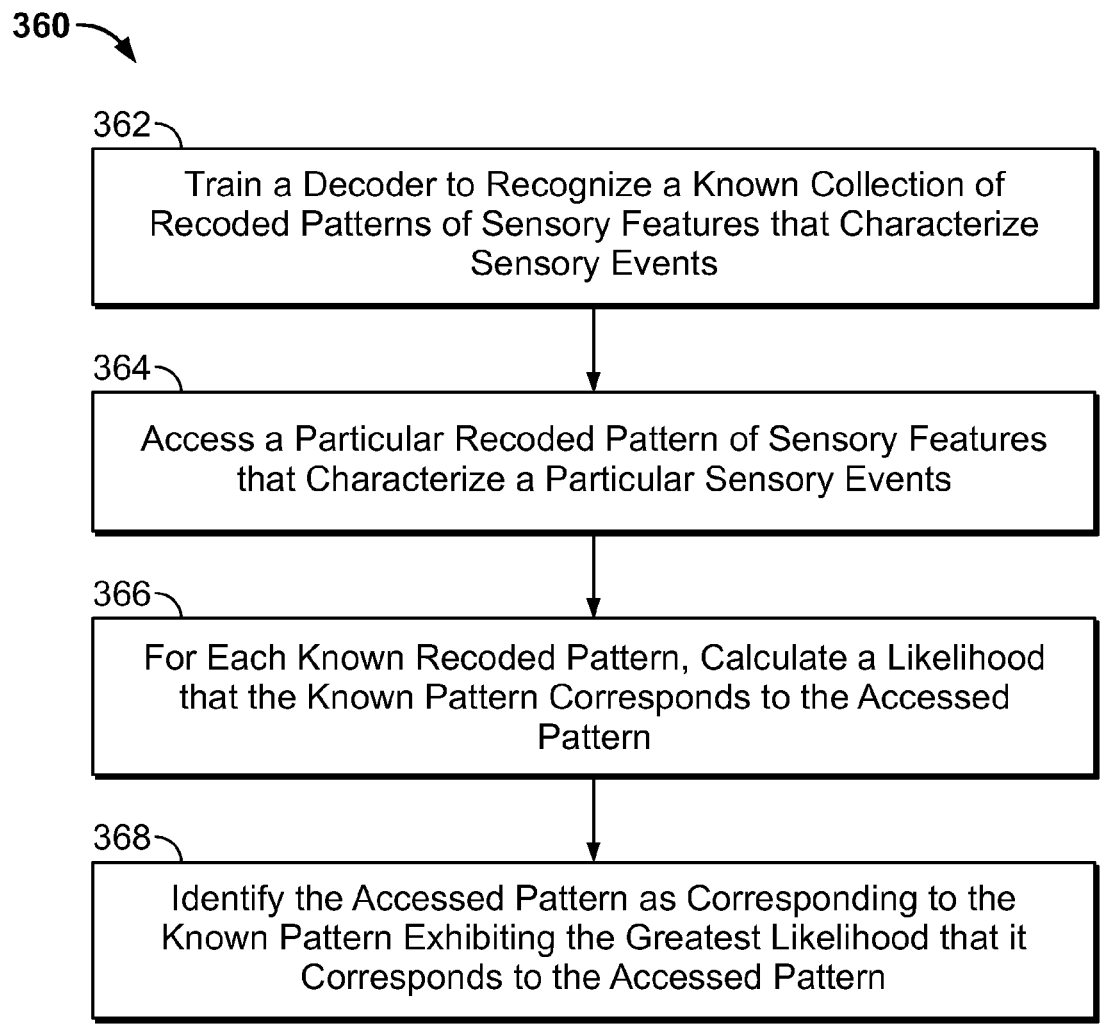
FIG. 3g is a flowchart of a process for decoding a pattern of active and inactive simulated neurons to identify a sensory event represented by the pattern of active and inactive simulated neurons.

FIG. 3g is a flowchart of a process 360 for decoding a pattern of active and inactive simulated neurons to identify a sensory event represented by the pattern of active and inactive simulated neurons. The process 360 may be performed by, for example, the decoder 350 of FIGS. 3d-3f. The process 360 begins by training the decoder to recognize a known collection of recoded patterns of sensory features that characterize sensory events (362). For example, output units corresponding to the known recoded patterns may be assigned to monitor the output of the simulated neurons known to be active in the recoded patterns.

After the decoder has been trained, the decoder accesses a particular recoded pattern of sensory features that characterize a particular sensory event (364). For example, a pattern of sensory activity may be input to a simulated neural recoder that recodes the initial pattern into a new pattern and inputs the new pattern to the decoder.

For each known recoded pattern, the decoder then calculates a likelihood that the known pattern corresponds to the accessed pattern (366). For example, output units corresponding to each known pattern and assigned to monitor the output of simulated neurons known to be active in the recoded patterns may count the number of active simulated neurons to which they are assigned. The number of active simulated neurons counted by each output unit may represent a measure of the likelihood that the accessed pattern corresponds to the known pattern that corresponds to the counter.

After the decoder has calculated measures of the likelihood that the accessed pattern corresponds to each of the known patterns, the decoder identifies the accessed pattern as corresponding to the known pattern that exhibits the greatest likelihood that it corresponds to the accessed pattern (368). For example, the accessed pattern may be identified as corresponding to the output unit that registers the highest count of active simulated neurons.

Simulated neurons, such as the example simulated neuron 100 of FIGS. 1a and 1b; simulated neural recoders, such as the example simulated neural recoder 200 of FIGS. 2a-2d; and decoders, such as the example decoder 350 of FIGS. 3d-3f, all can be implemented in digital logic and/or computer software platforms/programs stored in tangible, computer-readable mediums. The ability to implement simulated neurons, simulated neural recoders, and decoders in digital logic and/or computer software platforms/programs stored in tangible, computer readable mediums allows for increasingly powerful simulated neural recoders, decoders, and systems for identifying sensory events to be realized.

Figure 4:
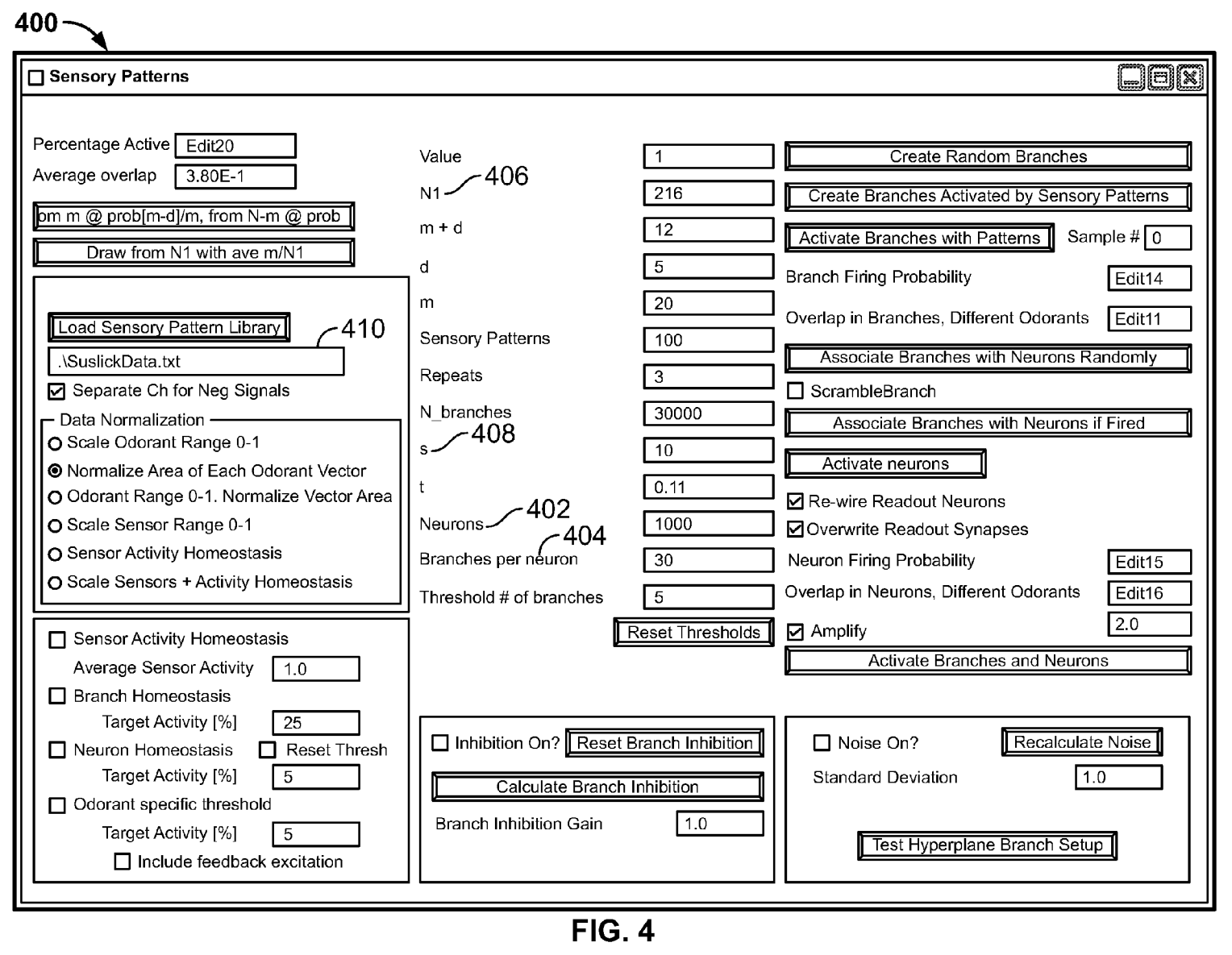

FIG. 4 is a screenshot of a control screen 400 of a computer-implemented sensory event identification system. Among other features, the control screen 400 includes a simulated neuron generator control 402, a branch generator control 404, a simulated sensory fiber generator control 406, a simulated sensory fiber and branch connection control 408, and a sensory event input control 410.

Collectively, the simulated neuron generator control 402, the branch generator control 404, the simulated sensory fiber generator control 406, and the simulated sensory fiber and branch connection control 408 enable a user to design and generate a computer-implemented simulated neural recoder. More particularly, the simulated neuron generator control 402 enables a user to specify the number of simulated neurons that should be generated for the neuronal array of the simulated neural recoder, and the branch generator control 404 enables a user to specify the number of branches that should be generated for each simulated neuron. Similarly, the simulated sensory fiber generator control 406 enables a user to specify the number of simulated sensory fibers that should be generated as inputs to the simulated neural recoder. The number of simulated sensory fibers to be generated for a simulated neural recoder generally corresponds to the number of different input signals that may be used to represent sensory events belonging to the class of sensory events that the simulated neural recoder is configured to recode. For example, if a simulated neural recoder is configured to recode representations of olfactory sensory events that may be characterized by any combination of one hundred different olfactory features, the neural recoder generally will have one hundred simulated sensory fibers. Finally, the simulated sensory fiber and branch connection control 408 enables a user to specify the number of simulated sensory fibers that should impinge each branch of the simulated neural recoder.

As illustrated in FIG. 4, the simulated neuron generator control 402 specifies that one thousand simulated neurons should be generated for the simulated neural recoder. In addition, the branch generator control 404 specifies that thirty branches should be generated for each simulated neuron, and the simulated sensory fiber generator control 406 specifies that two hundred sixteen simulated sensory fibers should be generated as inputs for the simulated neural recoder. Lastly, the simulated sensory fiber and branch connection control 408 specifies that ten simulated sensory fibers should impinge each branch. That is to say, the simulated neural recoder is to be generated out of one thousand simulated neurons, each having thirty branches, and two hundred sixteen simulated sensory fibers. In addition, ten simulated sensory fibers are to impinge each branch. Using these constraints, the sensory fibers are connected to the branches. For example, the fibers may be randomly connected to the branches.

Figure 5:
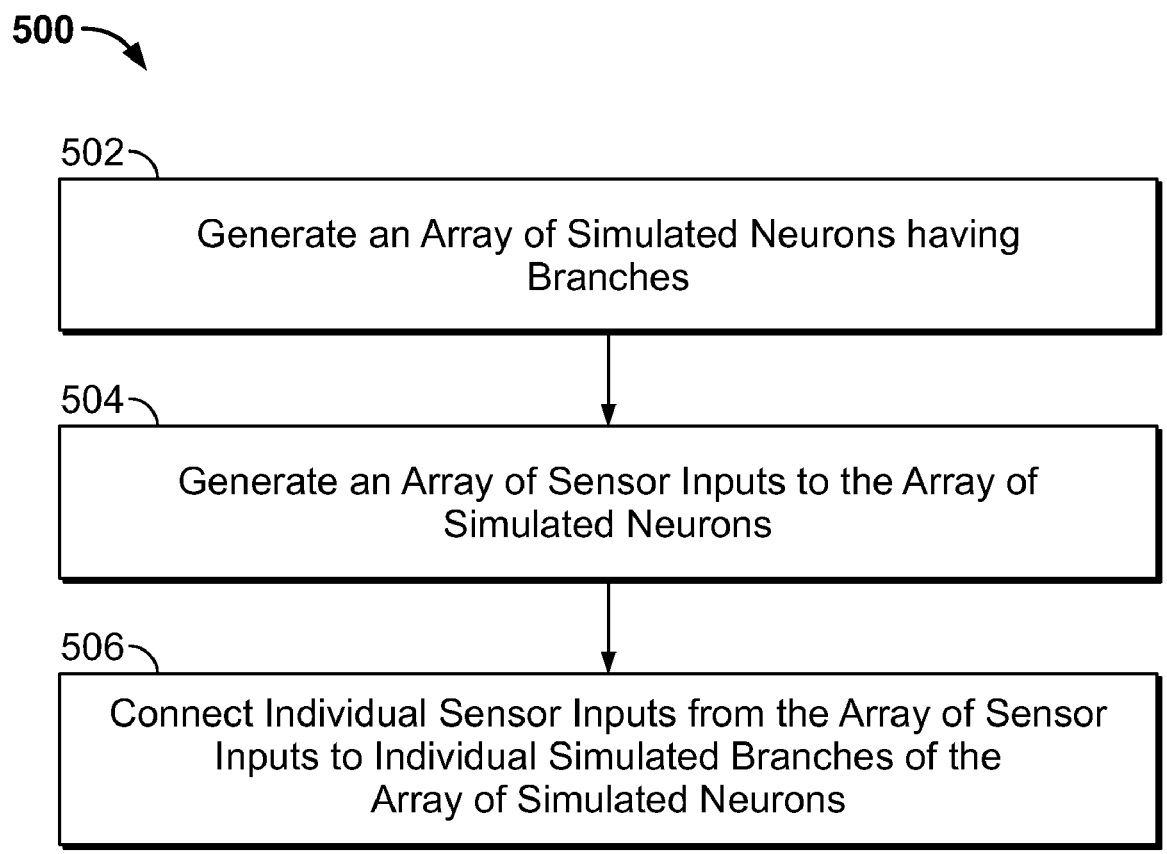
FIG. 5 is a flowchart of an example of a process for generating a computer-implemented simulated neural recoder.

FIG. 5 is a flowchart of an example of a process 500 for generating a computer-implemented simulated neural recoder. In some implementations, the process 500 may be performed by a computer through a control screen, such as, for example, control screen 400 of FIG. 4.

An array of simulated neurons having branches is generated (502). In some implementations, each of the simulated neurons may have the same number of branches. In other implementations, the simulated neurons may have different numbers of branches. Furthermore, in some implementations, the branches may have sub-branches. In addition, an array of sensor inputs to the array of simulated neurons is generated (504). Generally the array of sensor inputs will have a number of sensor inputs that is equal to the number of different input signals used to represent sensory events input into the sensory event recoder. After generating the array of simulated neurons having branches and the array of sensor inputs, individual sensor inputs are connected to individual branches (506). That is to say, for each branch of the array of simulated neurons, one or more sensor inputs are selected and subsequently connected to the branch. In some implementations, the sensor inputs selected to impinge each branch may be chosen randomly or pseudo-randomly. In other implementations, the sensor inputs selected to impinge each branch may be selected according to a pre-specified, non-random pattern, according to a user-specified pattern, in a self-organizing fashion, and/or in an activity-dependent fashion.

Referring again to FIG. 4, the control screen 400 also includes a sensory event input control 410. The sensory event input control 410 enables a user to specify a location for input sensory event data to be input to the computer-implemented simulated neural recoder generated using the control screen 400. For example, the sensory event input control 410 enables a user to specify a file that includes representations of input sensory events. Alternatively, the sensory event input control 410 enables a user to specify a stream of input data received from an array of sensory feature sensors in real-time or in nearly real-time.

In some implementations, sensory events are represented by sensory event vectors. In such implementations, the individual elements of the sensory event vectors may correspond to different sensory features. As such, a particular sensory event may be represented by a sensory event vector in which the values of the individual elements of the vector are indicative of the presence/absence of sensory features in the sensory event and/or in which the values of the individual elements of the vector are indicative of the strength of the sensory features in the sensory event. For example, olfactory sensory events (e.g., odors) may be represented by sensory event vectors in which the elements of the sensory event vectors correspond to different olfactory features. As such, a particular odor may be represented by a sensory event vector in which the values of the individual elements of the vector are indicative of the presence/absence of olfactory features in the odor and/or the strength of the olfactory features in the odor.

Figure 6:
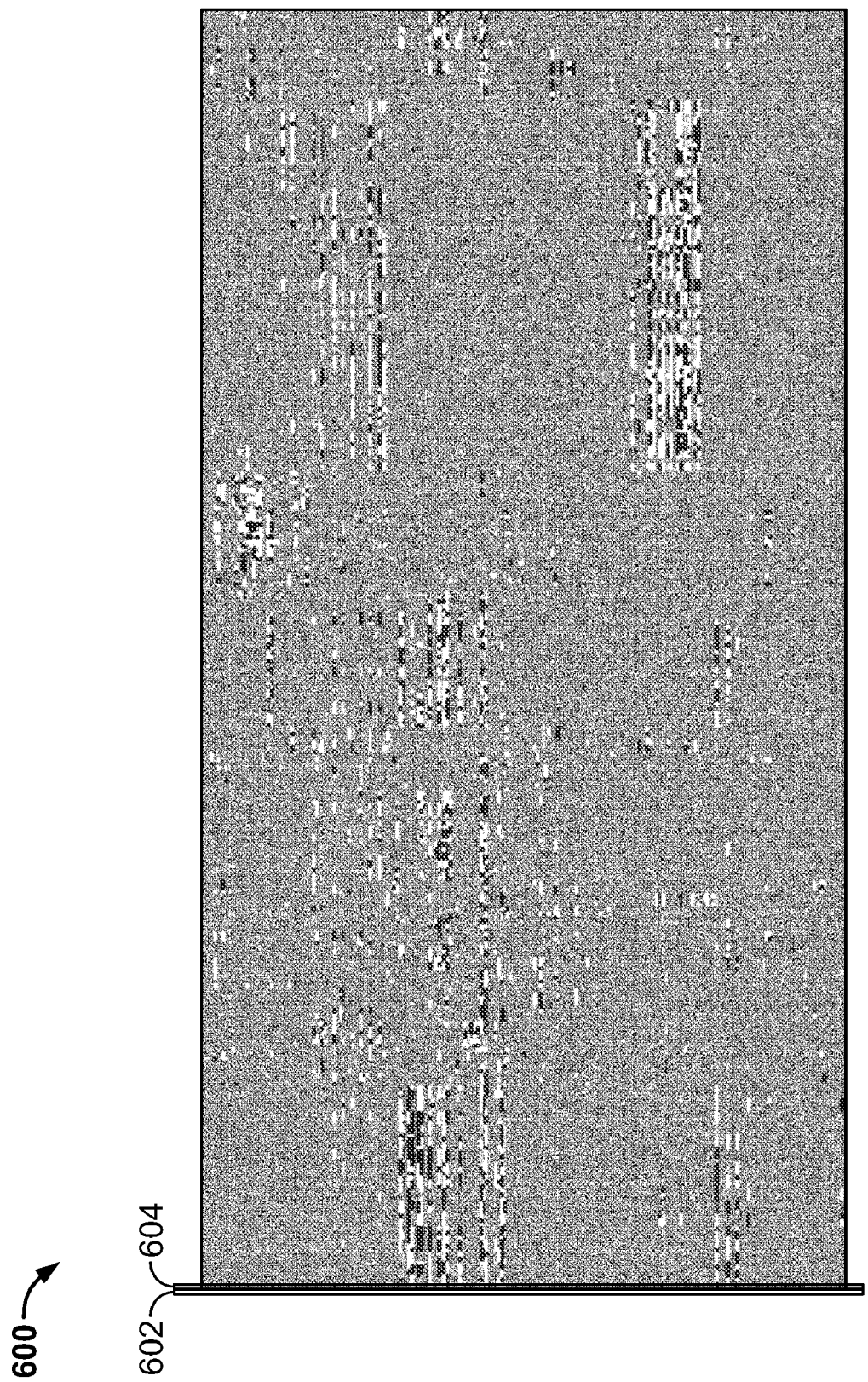
FIG. 6 is an illustration of a collection of input sensory event vectors.

FIG. 6 is an illustration of a collection 600 of input sensory event vectors. More particularly, the collection 600 of sensory event vectors is a collection of one hundred sensory event vectors representing one hundred different odorants. Each of the one hundred sensory event vectors includes two hundred sixteen elements representing two hundred sixteen different sensory features that characterize different odorants. As illustrated in FIG. 6, individual sensory vectors are depicted as columns of two hundred sixteen elements. For example, odorant 602 is depicted as the first column of two hundred sixteen elements. Similarly, odorant 604 is depicted as the second column of two hundred sixteen elements. The values of the various different elements of the sensory event vectors are depicted by different shadings. As illustrated in FIG. 6, the values of the individual elements of the sensory event vectors indicate both the presence of particular sensory features in different odorants as well as the strength of the different sensory features in the different odorants.

As can be seen in FIG. 6, many of the sensory event vectors representing the one hundred different odorants are quite similar. That is to say, there appears to be a rather significant overlap between the sensory features that characterize the different odorants. In fact, calculating the cross-correlation of the one hundred different sensory vectors reveals that there is an average overlap of 38% between each of the one hundred different sensory event vectors. Consequently, it may be difficult to discriminate the one hundred different sensory event vectors from one another.

Figure 7:
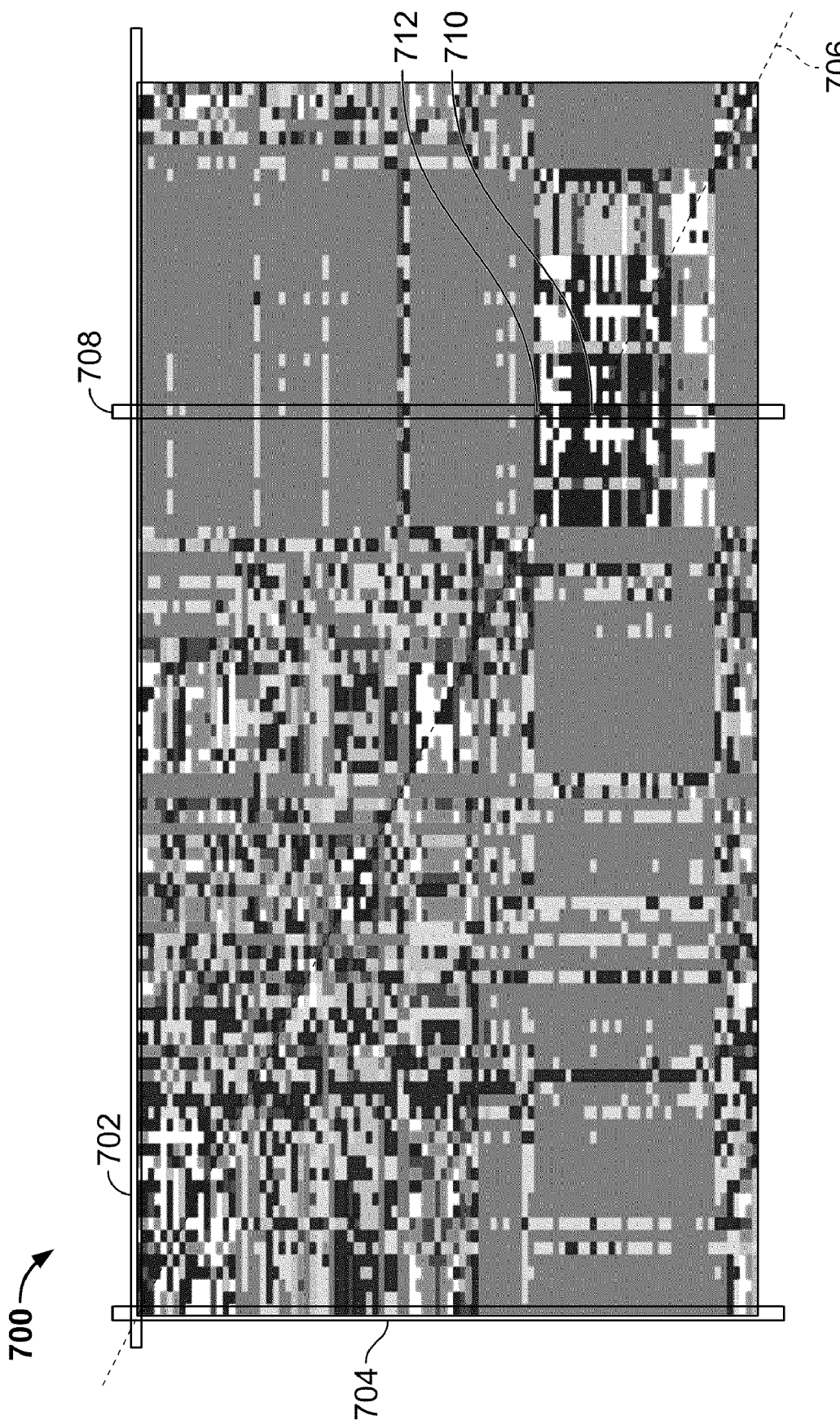
FIG. 7 is an illustration of the results of an attempt to directly decode the individual sensory event vectors of the collection of sensory event vectors of FIG. 7.

FIG. 7 is an illustration of the results of an attempt to directly decode the individual sensory event vectors of the collection 600 of sensory event vectors of FIG. 6 using a decoder such as, for example, a decoder configured similarly to the decoder 350 of FIGS. 3*d*-3*f*. More particularly, FIG. 7 presents a one hundred column by one hundred row matrix 700 in which the rows represent individual output units of the decoder corresponding to particular odorants and the columns represent the output values generated by the output units in response to particular sensory events. For example, row 702 represents an output unit of the decoder that corresponds to odorant 602 of FIG. 6 and column 704 represents the output of each of the one hundred output units of the decoder in response to being exposed to odorant 602 of FIG. 6.

As illustrated in FIG. 7, the value of row 702, which corresponds to the output unit assigned to odorant 602, in column 704, which represents the output of the decoder in response to exposure to odorant 702, is greater than the value of the other rows of column 704. Therefore, the decoder is capable of identifying odorant 602 because the output unit assigned to odorant 602 registers the highest output of all of the output units in response to exposure to odorant 602.

In order for the decoder to identify each of the one hundred odorants of FIG. 6 correctly, the output units corresponding to each odorant should register the highest output of all of the output units in response to exposure to the odorant to which it corresponds. In other words, in order for the decoder to identify each of the one hundred odorants of FIG. 6 correctly, the values of the elements along diagonal 706 of matrix 700 should be greater than the values of the other elements in their columns. However, as evident in FIG. 7, the values of the elements along diagonal 706 are not greater than the values of the other elements in their columns in all cases. For example, in column 708, element 710, which is along diagonal 706, does not have a greater value than all of the other elements in column 708. Rather, element 712, which is not along diagonal 706, has the greatest value of all of the elements in column 708, and therefore represents a false positive. The existence of such false positives in matrix 700 may be a result of the high degree of overlap between the sensory event vectors 600 of FIG. 6. More particularly, false positives may arise in matrix 700 when the sensory event vector associated with one odorant completely overlaps the sensory event vector of a second odorant. For example, the sensory event vector that corresponds to element 712 may completely overlap the sensory event vector that corresponds to element 710. Consequently, when the decoder is exposed to the odorant corresponding to element 710, element 712 actually registers a greater value than element 710.

Recoding the sensory event vectors of the collection 600 of sensory event vectors of FIG. 6 into a pattern of active and inactive simulated neurons using a simulated neural recoder, such as, for example, the simulated neural recoder specified by the control screen 400 of FIG. 4, may help to eliminate some of the overlap between the elements of the input sensory vectors and thereby improve the system's ability to discriminate and identify odorants. Referring again briefly to FIG. 4, the simulated neuron generator control 402, the branch generator control 404, the simulated sensory fiber generator control 406, and the simulated sensory fiber and branch connection control 408 of the control screen 400 were used to generate a simulated neural recoder having one thousand simulated neurons, each having thirty branches, and two hundred sixteen simulated sensory fibers, with ten simulated sensory fibers impinging each branch.

Figure 8A:
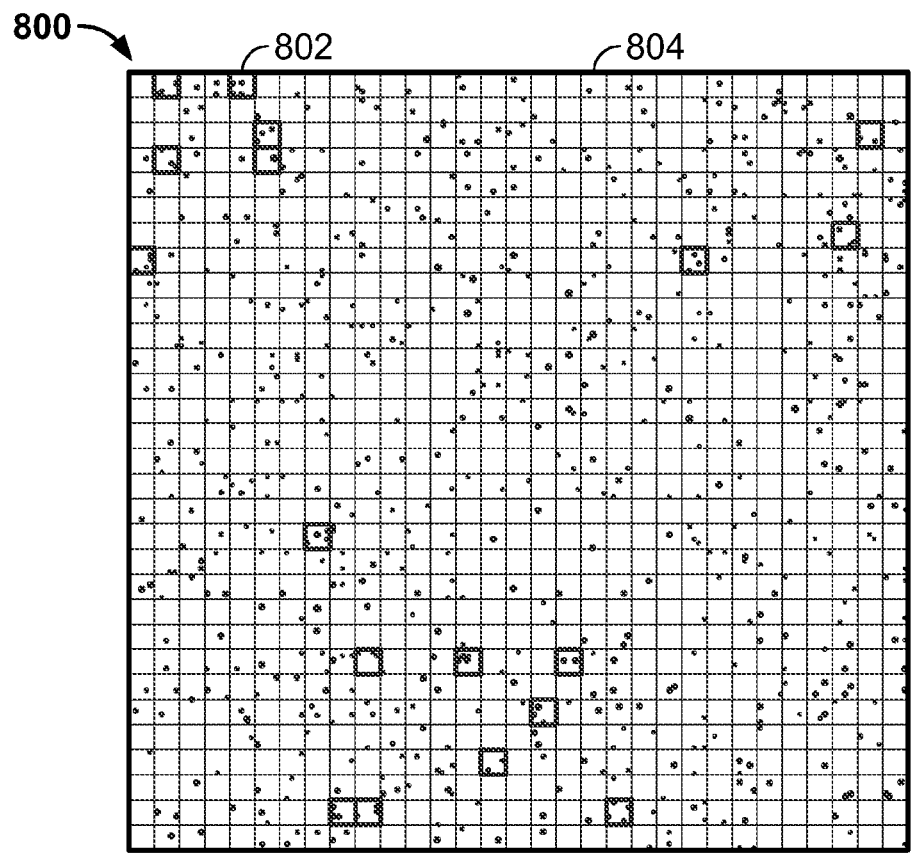
FIGS. 8a and 8b are block diagrams of examples of patterns of active and inactive neurons signifying recoded representations of two of the input sensory event vectors of the collection of input sensory event vectors of FIG. 6.
Figure 8B:
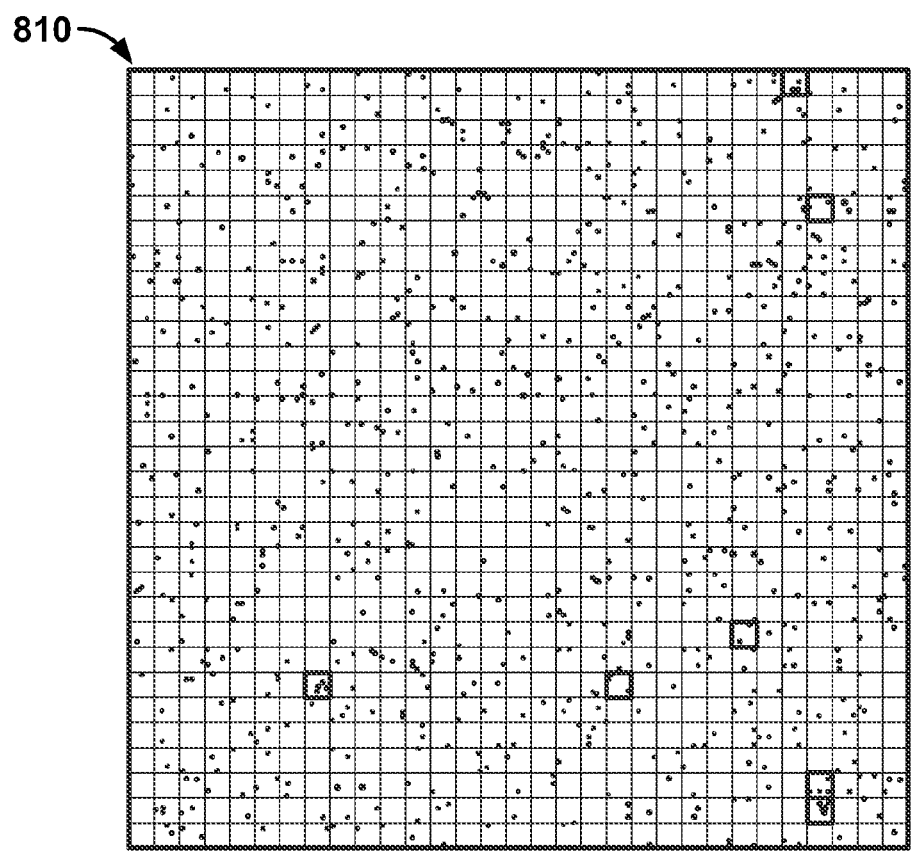

FIGS. 8*a* and 8*b* are block diagrams of examples of patterns of active and inactive neurons signifying recoded representations of two of the input sensory event vectors of the collection 600 of input sensory event vectors of FIG. 6 generated by inputting the collection 600 of sensory event vectors of FIG. 6 to the simulated neural recoder generated using the control screen 400 of FIG. 4. As illustrated in FIGS. 8*a* and 8*b*, individual simulated neurons are portrayed as squares, with squares with highlighted borders, for example simulated neuron 802 of FIG. 8*a*, representing active simulated neurons and squares without highlighted borders, for example simulated neuron 804 of FIG. 8*a*, representing inactive simulated neurons. In addition, as discussed further below in connection with FIG. 8*c*, although it may be difficult to see in FIGS. 8*a* and 8*b*, smaller squares within each individual simulated neuron identify the active branches of each individual simulated neuron. Although the simulated neural recoder generated using the control screen 400 of FIG. 4 has one thousand neurons, for the purposes of illustration, FIGS. 8*a* and 8*b* each only illustrate nine hundred sixty one simulated neurons in a 31×31 grid.

FIG. 8*a* illustrates a pattern 800 of active and inactive simulated neurons that signifies a recoded representation of input sensory event vector 602 of FIG. 6. Similarly, FIG. 8*b* illustrates a pattern 810 of active and inactive simulated neurons that signifies a recoded representation of input sensory event vector 604 of FIG. 6. Referring again to FIG. 6, a visual inspection of sensory event vectors 602 and 604 reveals a rather significant overlap between the elements of sensory event vectors 602 and 604. Referring now to FIGS. 8*a* and 8*b*, however, patterns 800 and 810 of active and inactive neurons signifying recoded representations of sensory event vectors 800 and 810 exhibit no overlap in active simulated neurons. That is to say, patterns 800 and 810 do not have any active simulated neurons in common. Consequently, it may be easier to discriminate the recoded representations of sensory event vectors 602 and 604 represented by patterns 800 and 810 of active and inactive simulated neurons than it is to discriminate sensory event vectors 602 and 604 themselves.

Figure 8C:
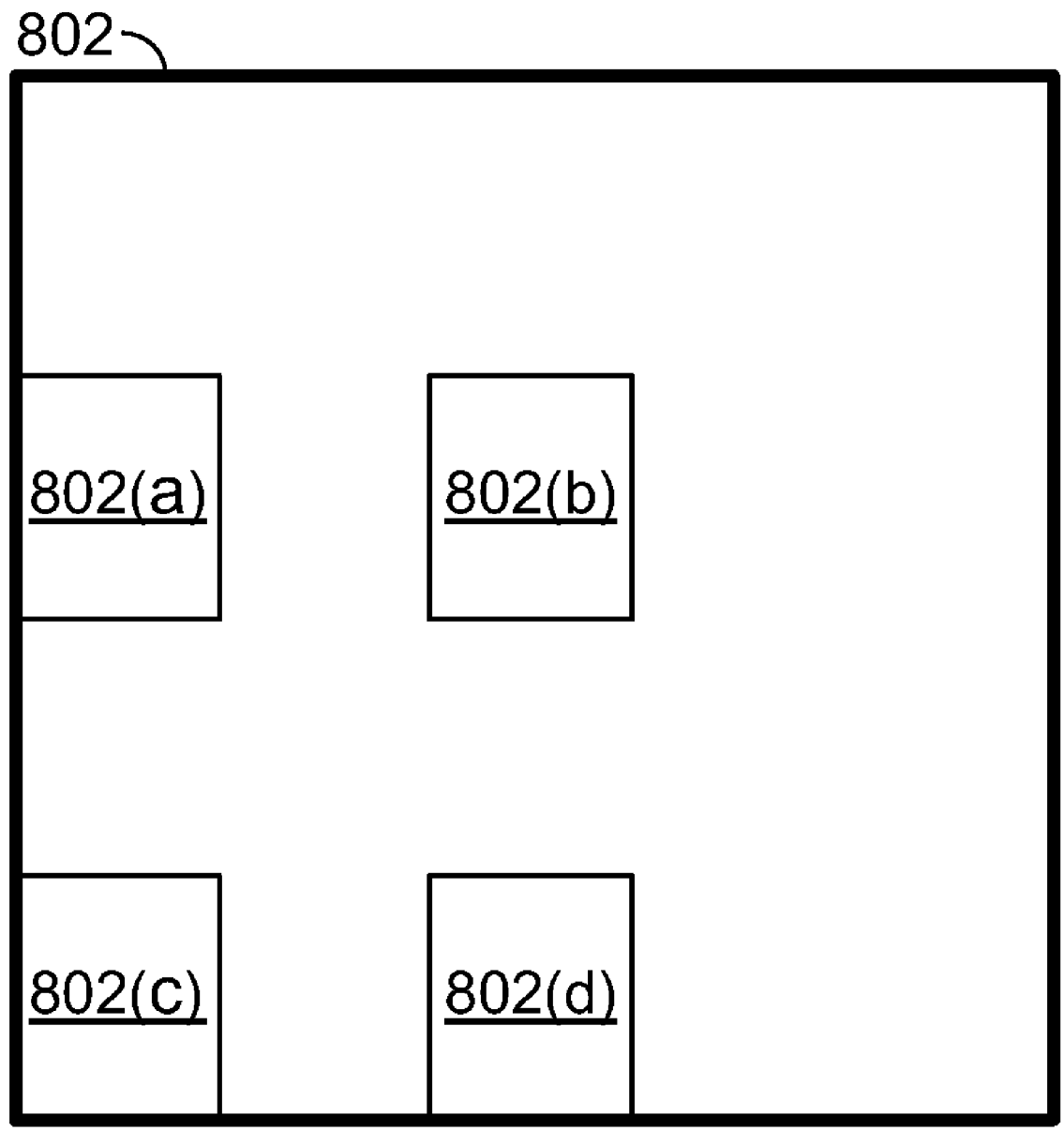

FIG. 8*c* is a close-up of simulated neuron 802 of FIG. 8*a*. As seen in FIG. 8*c*, simulated neuron 802 includes four active branches, represented by small squares 802(*a*), 802(*b*), 802(*c*), and 802(*d*). The small squares 802(*a*), 802(*b*), 802(*c*), and 802(*d*) identify the particular branches of simulated neuron 802 that fired in response to exposure to odorant 602.

Figure 8D:
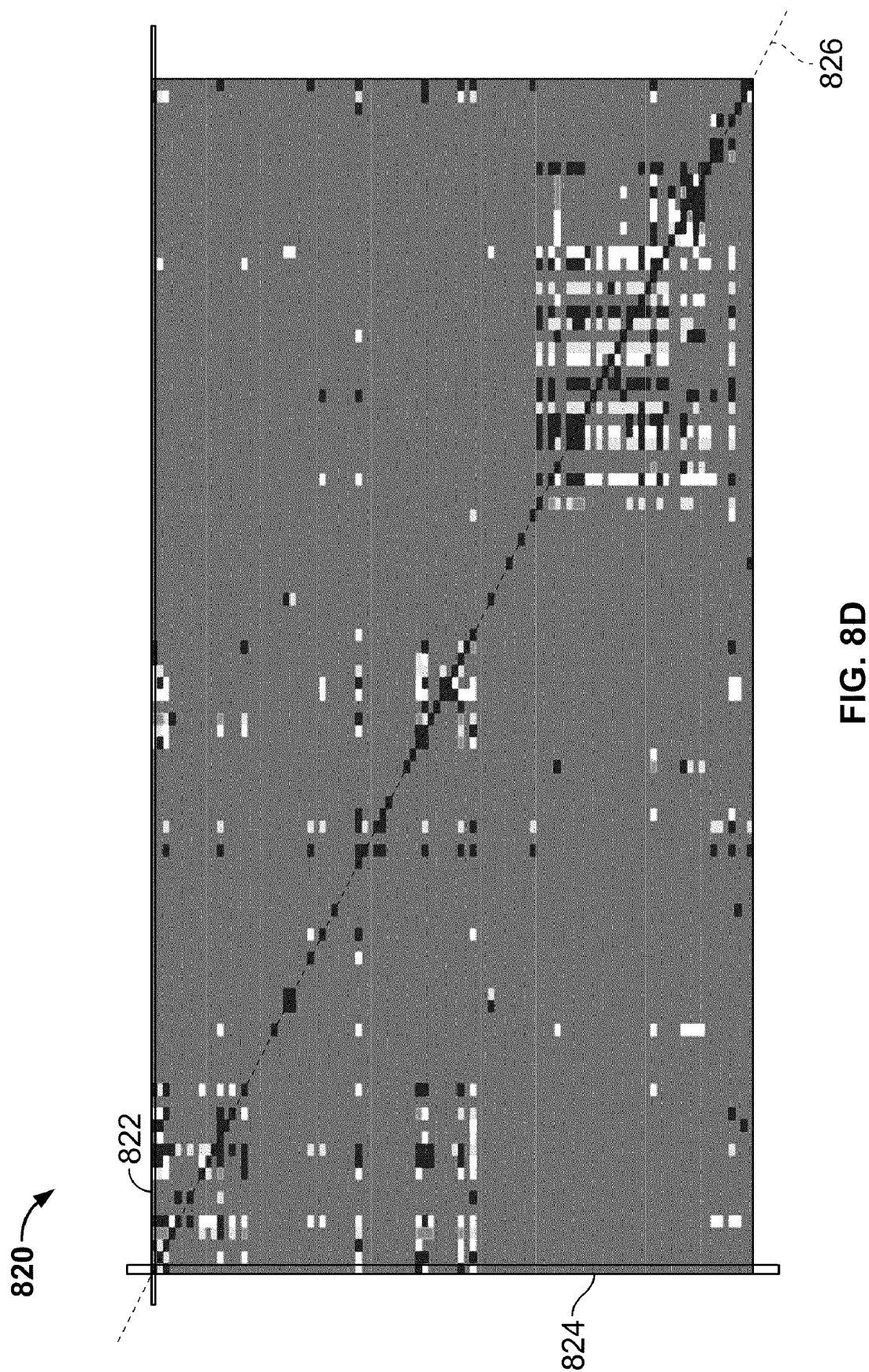
FIG. 8d is an illustration of the results of decoding the recoded representations of the sensory event vectors generated by inputting the sensory event vectors of FIG. 6 into a simulated neural recoder.

All of the sensory event vectors of the collection 600 of sensory event vectors of FIG. 6 can be recoded into patterns of active and inactive simulated neurons by inputting the sensory event vectors into the simulated neural recoder generated using the control screen 400 of FIG. 4. FIG. 8*d* is an illustration of the results of decoding the recoded representations of the sensory event vectors generated by inputting the sensory event vectors of FIG. 6 into the simulated neural recoder generated using the control screen 400 of FIG. 4. Like FIG. 7, FIG. 8*d* presents a one hundred column by one hundred row matrix 820 in which the rows represent individual output units of the decoder corresponding to particular sensory features and the columns represent the output values generated by the output units in response to particular odorants. For example, row 822 represents an output unit of the decoder that corresponds to odorant 602 of FIG. 6 and column 824 represents the output of each of the one hundred output units of the decoder in response to being exposed to odorant 602 of FIG. 6.

Comparing FIG. 8*d* to FIG. 7 reveals that there is far less activity off of the diagonal 826 in FIG. 8*d* than there is off of the diagonal 706 in FIG. 7. Consequently, FIG. 8*d* demonstrates that the recoded representations of the sensory vectors of FIG. 6 generated by inputting the sensory vectors to the simulated neural recoder generated using the control screen 400 of FIG. 4*c* may be discriminated from each other and identified with greater accuracy than the sensory event vectors themselves. However, the matrix 820 illustrates that room for improvement may remain. In particular, there is still a considerable amount of activity off of the diagonal 826 in FIG. 8*d*. In addition, there are a number of columns in matrix 820 that exhibit no activity in any counters of the decoder. The absence of activity in particular columns of the matrix 802 indicates that no simulated neurons fired in response to exposure to the odorants corresponding to the columns for which no activity is observed in matrix 820.

Figure 9A:
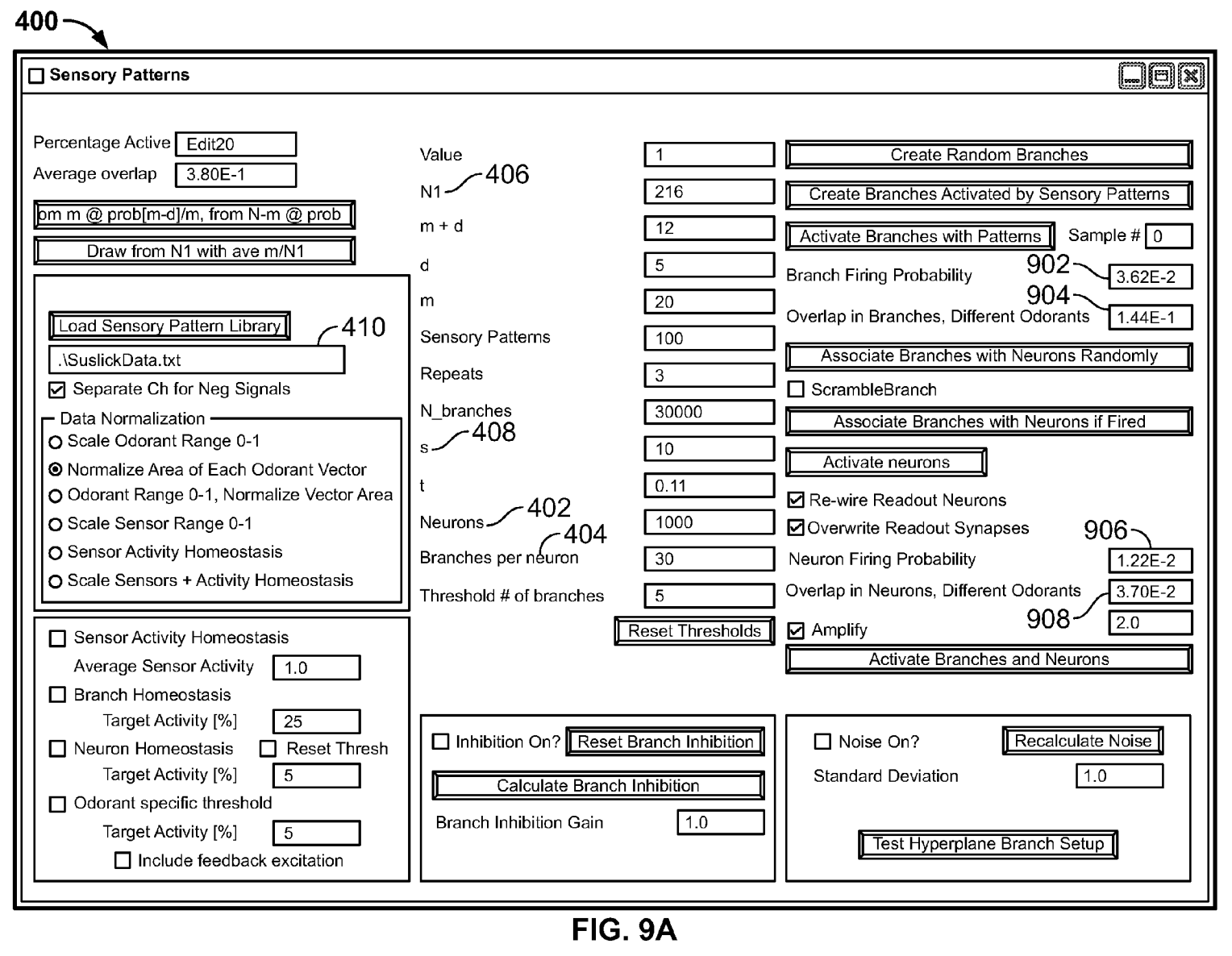

FIG. 9*a* is a screenshot of the control screen 400 after all of the sensory event vectors of the collection 600 of sensory event vectors of FIG. 6 have been input to the simulated neural recoder generated in response to the parameters specified in the simulated neuron generator control 402, the branch generator control 404, the simulated sensory fiber generator control 406, and the simulated sensory fiber and branch connection control 408.

As illustrated in FIG. 9*a*, the control screen includes a number of different fields for displaying statistics related to the process of recoding the sensory event vectors. Among other fields for displaying statistics related to the recoding process, the control screen includes a branch firing probability field 902, a branch overlap field 904, a neuron firing probability field 906, and a neuron overlap field 908. The branch firing probability field 902 displays the probability that a particular branch will fire in response to any of the one hundred sensory vectors. The branch overlap field 904 displays the average overlap between active branches for any two of the one hundred sensory event vectors. The neuron firing probability field 906 displays the probability that a particular simulated neuron will fire in response to any of the one hundred sensory vectors. The neuron overlap field 908 displays the average overlap between active simulated neurons for any two of the sensory event vectors. As illustrated in FIG. 9*a*, the probability that a particular branch will fire in response to one of the one hundred input sensory vectors is 3.62%, the average overlap between active branches for any two of the sensory event vectors is 14.4%, the probability that a particular simulated neuron will fire in response to one of the one hundred input sensory vectors is 1.22%, and the average overlap between active simulated neurons for any two of the sensory event vectors is 3.70%.

As discussed above in connection with FIG. 8*d*, several sensory event vectors of the collection 600 of sensory event vectors of FIG. 6 that were input into the neural recoder generated using the control screen 400 of FIG. 4 resulted in output patterns in which no simulated neurons fired. Considering that the probability that a particular branch will fire in response to one of the one hundred input sensory event vectors is 3.62% and the probability that a particular simulated neuron will fire in response to one of the one hundred input sensory event vectors is 1.22%, this is not altogether surprising. Nevertheless, in order to more accurately identify particular sensory event vectors, it may be desirable to adjust one or more of the parameters of the simulated neural recoder generated using the control screen 400 of FIG. 4 in order to increase the probability that at least one simulated neuron will fire in response to each sensory event vector.

Figure 9B:
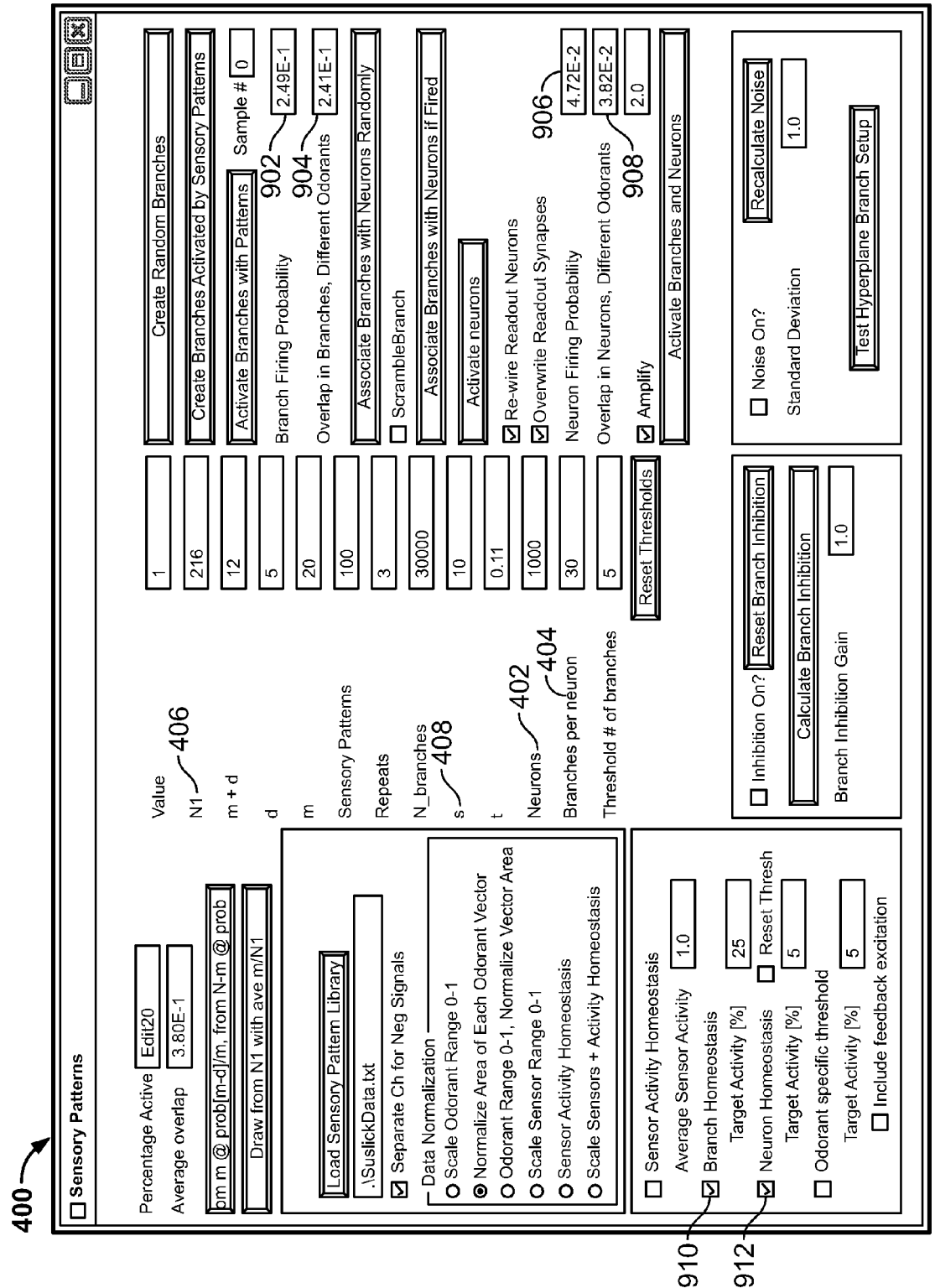

FIG. 9b is a screenshot of the control screen 400 that illustrates how the control screen enables a user to specify a desired activity level of the branches and the simulated neurons of the simulated neural recoder. As illustrated in FIG. 9b, the control screen includes a branch homeostasis control 910 and a neuron homeostasis control 912.

The branch homeostasis control 910 enables a user to specify a desired level of activity for each of the branches of the simulated neural recoder. The branch homeostasis control 910 enables a user to activate the branch homeostasis control 910 by selecting the check box of the branch homeostasis control 910. As illustrated in FIG. 9b, the desired activity level for each branch is specified as 25%.

When the branch homeostasis control 910 is activated, after each sensory event vector is input to the simulated neural recoder, the simulated neural recoder adjusts the threshold activity level required to trigger each branch such that the probability that a particular branch will fire in response to any of the sensory event vectors approximates the desired level of activity for each of the branches specified in the branch homeostasis control 910. That is to say, for each branch, the simulated neural recoder repeatedly adjusts the threshold activity level in the simulated sensory fibers that impinge the branch required to trigger the branch to fire such that the probability that the branch will fire in response to any given sensory event vector approximates the desired level of activity for each of the branches specified in the branch homeostasis control 910.

Similarly, the neuron homeostasis control 912 enables a user to specify a desired level of activity for each of the simulated neurons of the simulated neural recoder. In addition, the neuron homeostasis control 912 enables a user to activate the neuron homeostasis control 912 by selecting the check box of the neuron homeostasis control 912. As illustrated in FIG. 9b, the desired activity level for each simulated neuron is specified as 5%.

When the neuron homeostasis control 912 is activated, after each sensory event vector is input to the simulated neural recoder, the simulated neural recoder adjusts the threshold activity level required to trigger each simulated neuron such that the probability that a particular simulated neuron will fire in response to any of the sensory event vectors approximates the desired level of activity for each of the simulated neurons specified in the neuron homeostasis control 912. That is to say, for each simulated neuron, the simulated neural recoder repeatedly adjusts the threshold activity level in the branches of the simulated neuron required to trigger the simulated neuron to fire such that the probability that the simulated neuron will fire in response to any given sensory event vector approximates the desired level of activity for each of the simulated neurons specified in the neuron homeostasis control 912.

The branch firing probability field 902 of FIG. 9b displays the probability that a particular branch will fire in response to any sensory event vector and the neuron firing probability field 906 of FIG. 9b displays the probability that a particular simulated neuron will fire in response to any sensory event vector with the branch and neuron homeostasis controls 910 and 912 activated and specifying a desired activity level of 25% for the branches and a desired activity level of 5% for the simulated neurons. Referring again briefly to FIG. 9a, when the branch and neuron homeostasis controls were not activated, the probability that a particular branch would fire in response to any sensory event vector was 3.62% and the probability that a particular simulated neuron would fire in response to any sensory event vector was 1.22%. Now, referring again to FIG. 9b, the branch firing probability field 902 indicates that when the branch and neuron homeostasis controls 910 and 912 are activated and specify a desired activity level of 25% for the branches and a desired activity level of 5% for the simulated neurons, the probability that a particular branch will fire in response to any sensory event vector is 24.9%, which is close to the desired branch activity level of 25%. In addition, the neuron firing probability field 906 indicates that, under the same conditions, the probability that a particular simulated neuron will fire in response to any sensory event vector is 3.82%, which is close to the desired neuron activity level of 5%.

Figure 9C:
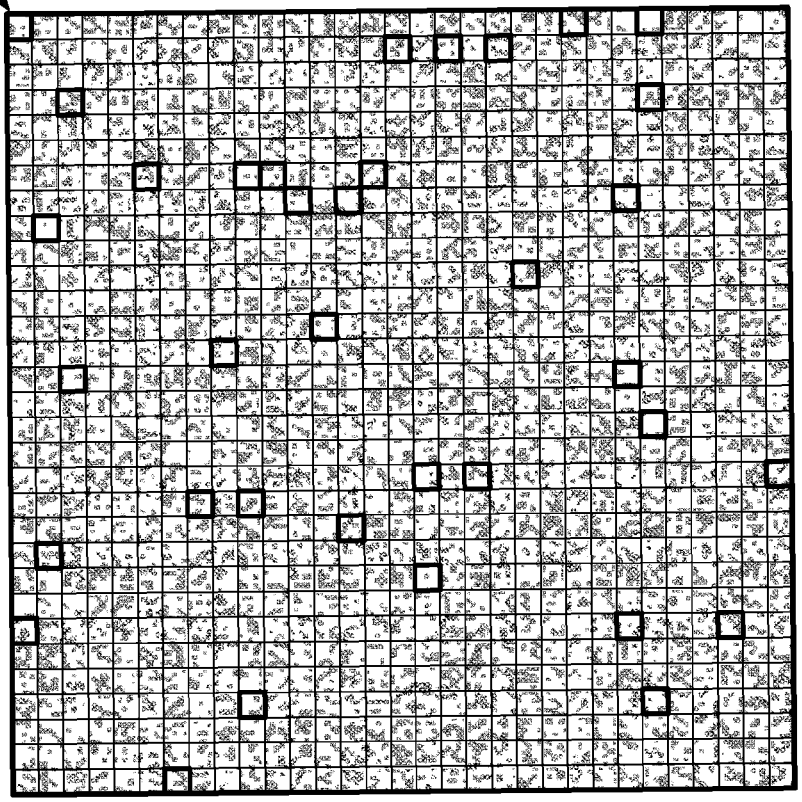
FIGS. 9c and 9d are block diagrams of additional patterns of active and inactive neurons signifying recoded representations of two of the input sensory event vectors of the collection of input sensory event vectors of FIG. 6.
Figure 9D:
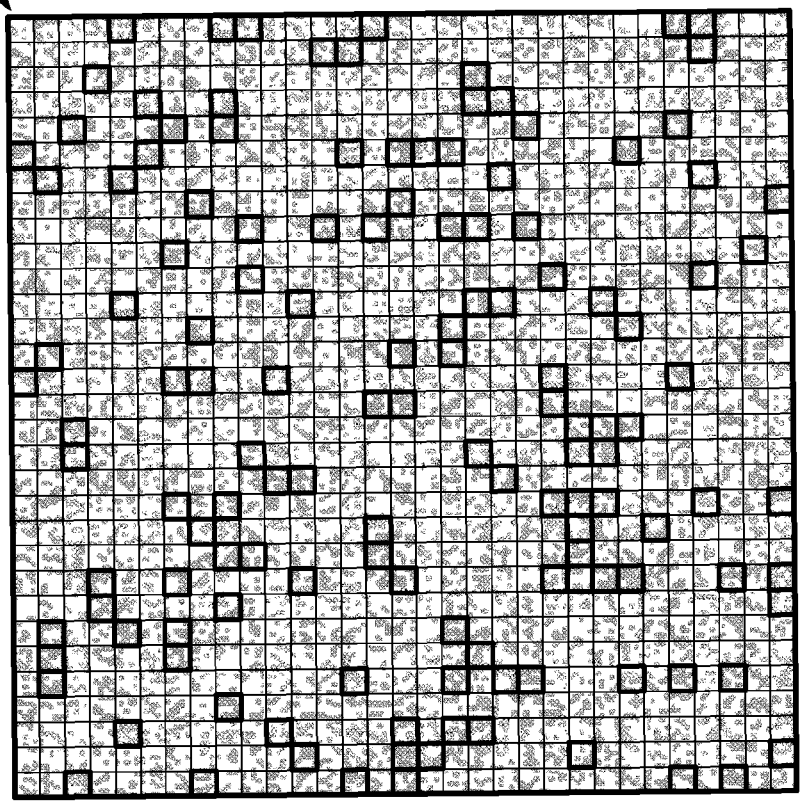

FIGS. 9c and 9d are block diagrams of patterns 920 and 930 of active and inactive neurons signifying recoded representations of input sensory event vectors 602 and 604 of FIG. 6 respectively, that were generated by inputting sensory event vectors 602 and 604 into the simulated neural recoder with the branch and neuron homeostasis controls 910 and 912 both activated and specifying a desired activity level of 25% for the branches and a desired activity level of 5% for the simulated neurons. As in FIGS. 8a and 8b, in FIGS. 9c and 9d, individual simulated neurons are portrayed as small squares, with squares with highlighted borders representing active simulated neurons and squares without highlighted borders representing inactive neurons.

Comparing FIG. 9c to FIG. 8a reveals that pattern 920 includes many more activated simulated neurons than pattern 800. Similarly, comparing FIG. 9d to FIG. 8b reveals that pattern 930 includes many more activated simulated neurons than pattern 810. The increased activity in patterns 920 and 930 as compared to patterns 800 and 810 may be attributable to activating both the branch homeostasis control 910 and the neuron homeostasis control 912, and specifying a desired activity level of 25% for the branches and a desired activity level of 5% for the simulated neurons.

Figure 9E:
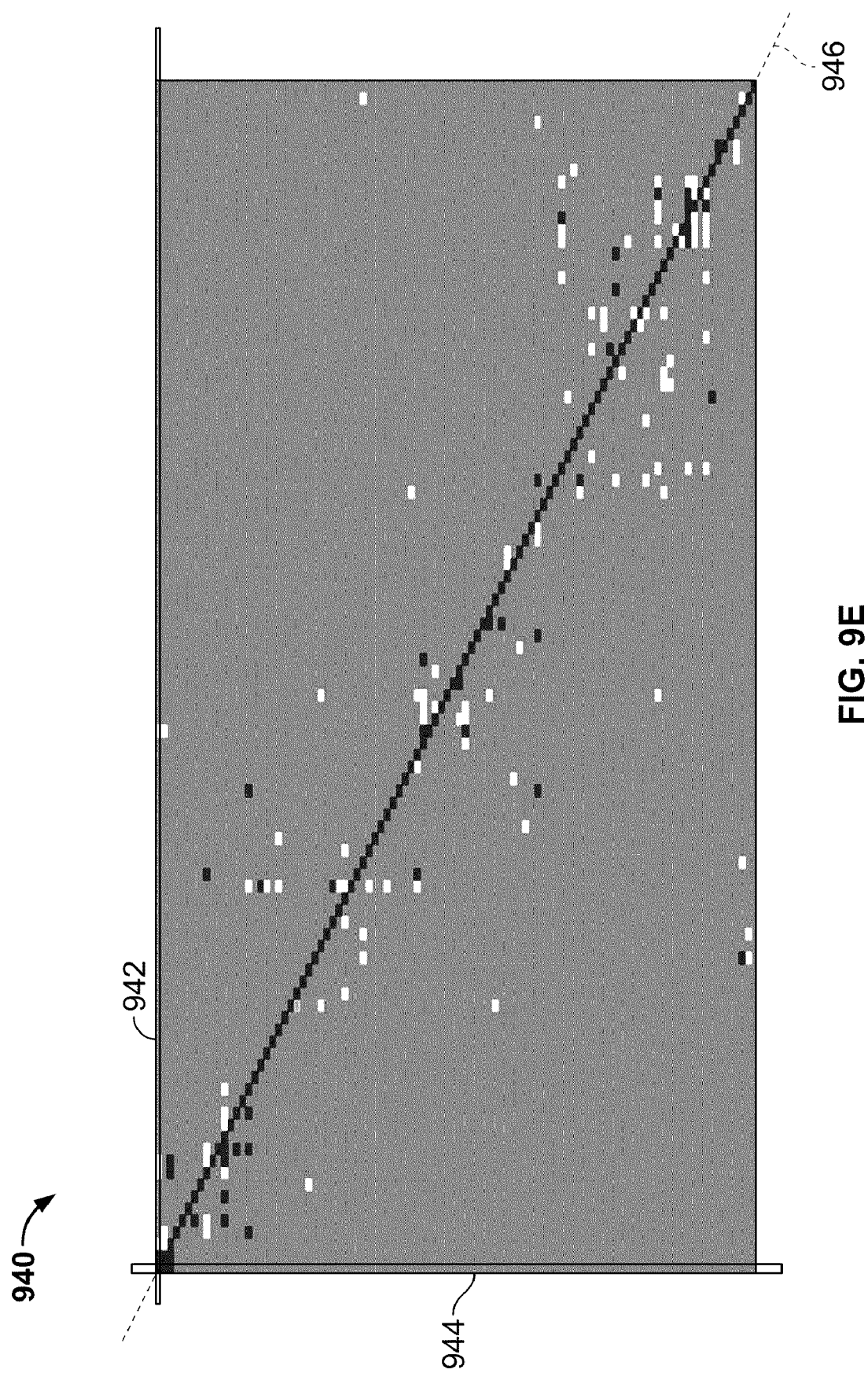
FIG. 9e is an illustration of additional results of decoding the recoded representations of the sensory event vectors generated by inputting the sensory event vectors of FIG. 7 into a simulated neural recoder.

All of the sensory event vectors of the collection 600 of sensory event vectors of FIG. 6 can be recoded into patterns of active and inactive simulated neurons by inputting the sensory event vectors into the simulated neural recoder generated with the branch and neuron homeostasis controls 910 and 912 activated and specifying a desired activity level of 25% for the branches and a desired activity level of 5% for the simulated neurons. FIG. 9e is an illustration of the results of decoding the recoded representations of the sensory event vectors generated by inputting the sensory event vectors of FIG. 6 into the simulated neural recoder with the branch and neuron homeostasis controls 910 and 912 activated and specifying a desired activity level of 25% for the branches and a desired activity level of 5% for the simulated neurons. Like FIG. 7 and FIG. 8d, FIG. 9e presents a one hundred column by one hundred row matrix 940 in which the rows represent individual output units of the decoder corresponding to particular sensory features and the columns represent the output values generated by the output units in response to particular odorants. For example, row 942 represents an output unit of the decoder that corresponds to odorant 602 of FIG. 6 and column 944 represents the output of each of the one hundred output units of the decoder in response to being exposed to odorant 602 of FIG. 6.

Comparing FIG. 9e to FIG. 8d reveals that the diagonal 946 of FIG. 9e is much more easily discernible than the diagonal 826 of FIG. 8d and that there is far less activity off of the diagonal 946 in FIG. 9e than there is off of the diagonal 826 in FIG. 8d. Consequently, FIG. 9e demonstrates that the recoded representations of the sensory vectors of FIG. 6 generated by inputting the sensory event vectors to the simulated neural recoder with the branch and neuron homeostasis controls activated and specifying desired activity levels of 25% and 5% respectively may be discriminated from each other and identified with greater accuracy than the recoded representations of sensory event vectors generated by inputting the sensory event vectors to the simulated neural recoder without the branch and neuron homeostasis controls 910 and 912 activated.

Figure 10:
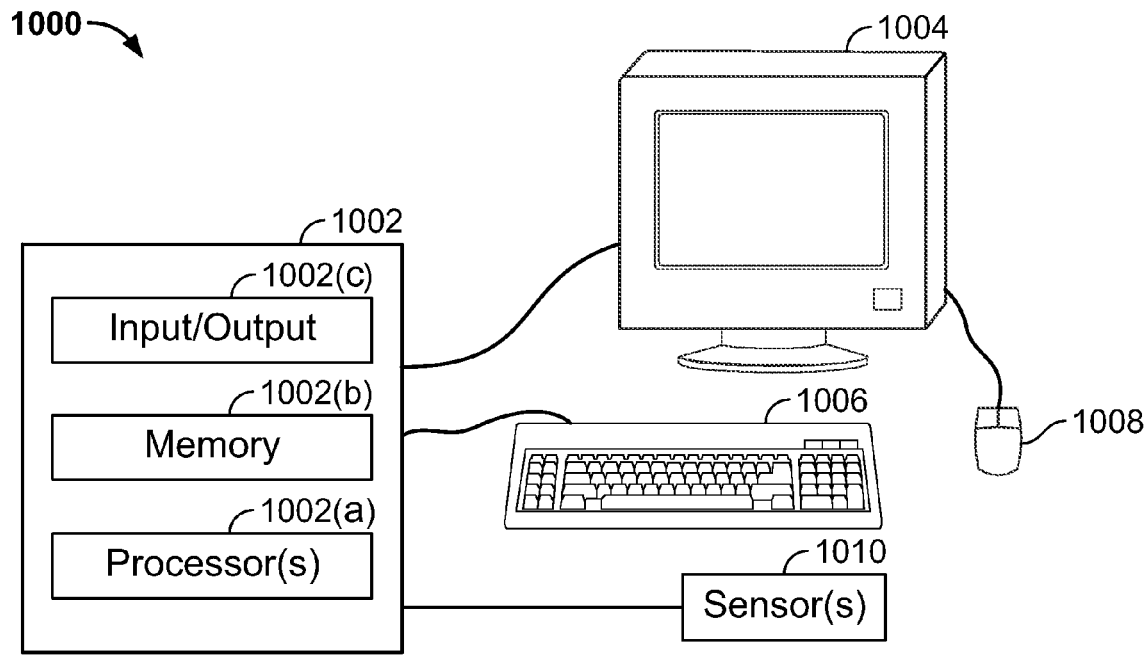
FIG. 10 is a block diagram of an example of a system for identifying sensory events.

FIG. 10 is a block diagram of an exemplary system 1000 for identifying sensory events. The system 1000 is configured to recode representations of sensory events. In addition, the system 1000 is configured to identify particular sensory events by decoding the recoded representations of the sensory events. Briefly, the system includes a computer 1002, a display 1004, a keyboard 1006, a pointing device 1008 (e.g., a mouse), and one or more sensors 1010. Examples of sensors may include pixels of a camera device with either conventional or center/surround receptive properties, elements of an olfactory odorant detection array, elements of an artificial auditory sensory array such as a silicon cochlea, or elements responsive to signals which do not correspond to human sensor detectors at all, such as the signals from a large system of sensors present in a complex industrial manufacturing operation.

The computer 1002 may be implemented by, for example, a general purpose computer capable of responding to and executing instructions in a defined manner, a personal computer, a special-purpose computer, a workstation, a server, a notebook or laptop computer, a personal digital assistant (PDA), a wireless telephone, a device, a component, other equipment, or some combination of these items that is capable of responding to and executing instructions. The computer 1002 and its associated sensor(s) 1010 may be incorporated into, for example, an appliance, a user-mountable device, a robot or some other piece of equipment. Particular implementations may not include the display 1004, the keyboard 106 and/or the pointing device 1008.

As illustrated in FIG. 10, computer 1000 includes one or more processors 1002(*a*) that process instructions, one or more memory/storage devices 1002(*b*) that store data and various programs such as operating systems and application programs, and one or more input/output (I/O) interfaces 1002 (*c*) that enable computer 1002 to communicate with one or more other devices, such as, for example, display 1004, keyboard 1006, pointing device 1008, a communications network (e.g., a local area network (LAN), a wide area network (WAN), or the Internet) (not shown), and/or sensor(s) 1010 for sensing features of a sensory event.

The processor 1002(*a*) may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the processor 1002(*a*).

Memory 1002(*b*) may include random access memory (RAM) for storing computer instructions and data in a volatile memory device for processing by processor 1002(*a*). In addition, memory 1002(*b*) also may include read-only memory (ROM) for storing invariant low-level system code or data for basic system functions such as basic I/O, startup, or reception of keystrokes from keyboard 1006 in a non-volatile memory device. Furthermore, memory 1002(*b*) may store computer executable instructions for an operating system and/or application programs, including, for example, sensory event recoding and decoding applications, as well as data files.

During operation, computer executable instructions may be loaded into a region of RAM in memory 1002(*a*) so that they may be accessed by processor 1002 in order to execute software programs.

I/O interfaces 1002(*c*) may include a display interface that enables computer 1002 to render graphics, images, and/or text on display 1004. In addition, I/O interfaces 1002(*c*) may include a keyboard interface that enables computer 1002 to receive keystroke input from keyboard 1006, a pointing device interface that enables computer 1002 to receive input from pointing device 1008, and a communications interface that enables computer 1002(*c*) to exchange data or other information with a communications network (not shown). I/O interfaces 1002(*c*) also may include a sensor interface that enables computer 1002 to receive input sensory event information from the one or more sensors 1010 that sense different features of sensory events. After such sensory event information is received, computer 1002 may recode and/or decode the sensory event information.

The system 1000 for identifying sensory events of FIG. 10 is merely an example of a system for identifying sensory events. Accordingly, other systems, configurations, and/or architectures also may be used to implement systems for identifying sensory events. For example, systems for identifying sensory events may be implemented as embedded devices having one or more built-in sensors and with logic units implemented in field programmable gate arrays (FPGAs) or application-specific integrated circuit (ASICS).

As discussed above, the efficacy of a neural recoder composed of one or more simulated branched neural elements may be enhanced by the homeostatic adjustment of the threshold activation levels required to activate the branches and simulated neural elements of the neural recoder. For example, as discussed above in connection with FIGS. 9*b*-9*e*, the control screen 400 of the computer-implemented sensory event identification system includes controls that enable a user to specify desired levels of activity for the branches and neurons of a neural recoder and activating such controls may enhance performance of the neural recoder.

Figure 11:
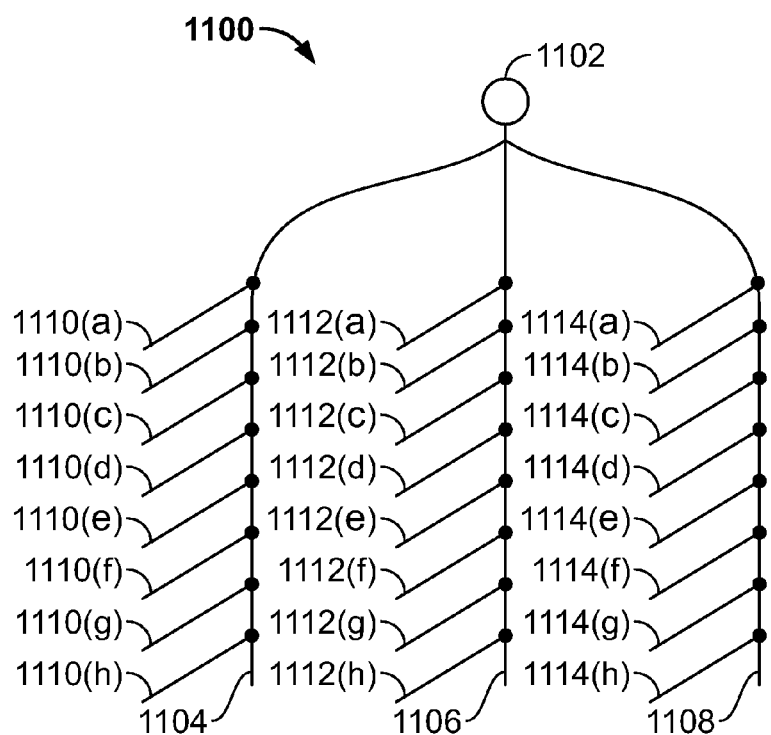
FIG. 11 is a block diagram of an example of a simulated branched neural element that is configured to homeostatically adjust the threshold activation levels required to activate the branches and the simulated cell body of the simulated branched neural element.

FIG. 11 is a block diagram of an example of a simulated branched neural element 1100 that includes a simulated cell body 1102 and three branches 1104, 1106, and 1108 and that is configured to homeostatically adjust the threshold activation levels required to activate the branches 1104, 1106, and 1108 and the simulated cell body 1102. The simulated branched neural element 1102 of FIG. 11 may be combined with one or more additional simulated branched neural elements to form a neural recoder.

As illustrated in FIG. 11, each of the branches 1104, 1106, and 1108 is impinged by eight inputs. More particularly, branch 1104 is impinged by inputs 1110(*a*), 1110(*b*), 1110(*c*), 1110(*d*), 1110(*e*), 1110(*f*), 1110(*g*), and 1110(*h*), branch 1106 is impinged by inputs 1112(*a*), 1112(*b*), 1112(*c*), 1112 (*d*), 1112(*e*), 1112(*f*), 1112(*g*), and 1112(*h*), and branch 1108 is impinged by inputs 1114(*a*), 1110(*b*), 1114(*c*), 1114(*d*), 1114(*e*), 1114(*f*), 1114(*g*), and 1114(*h*). FIG. 11 is merely one example of a simulated branched neural element. Accordingly, other simulated branched neural elements that differ in structure from the simulated branched neural element 1110 of FIG. 11 also may be implemented. For example, simulated branched neural elements that have a greater or lesser number of branches may be implemented. Similarly, simulated branched neural elements that have input branches that are impinged by a greater or lesser number of inputs may be implemented. Furthermore, simulated branched neural elements having elaborate hierarchical tree structures including numerous branches and sub-branches also may be implemented.

Referring to FIG. 11, the branches 1104, 1106, and 1108 are configured to activate in response to some combination of concurrent activity in the inputs that impinge the branches 1104, 1106, and 1108. More particularly, the branches 1104, 1106, and 1108 are configured to activate in response to threshold levels of concurrent activity in the inputs that impinge them.

In some implementations, the branches 1104, 1106, and 1108 may be configured to activate in response to threshold numbers of inputs that impinge them being concurrently active (e.g., threshold numbers of inputs being active during a specified window of time). Additionally or alternatively, the branches 1104, 1106, and 1108 may be configured to activate in response to sums of concurrently received input signals (e.g., sums of input signals received during specified windows of time) exceeding threshold levels. In such implementations, the sums of concurrently received input signals may be straight linear sums of concurrently received input signals or the sums of concurrently received input signals may be weighted sums of concurrently received input signals. For example, the connections between the inputs and the branches 1104, 1106, and 1108 may be assigned various different weights, and sums of concurrently received input signals may be calculated based on the weights assigned to the different connections between the inputs and the branches 1104, 1106, and 1108. In other implementations, the branches 1104, 1106, and 1108 may be configured to activate in response to non-linear combinations of concurrently received input signals (e.g., non-linear combinations of input signals received during specified windows of time) exceeding a threshold value.

In some cases, the threshold levels of concurrent activity required to trigger the branches 1104, 1106, and 1108 may be the same for each branch while, in other cases, the threshold levels of concurrent activity required to trigger the branches 1104, 1106, and 1108 may be different for different branches.

The activation frequencies of the branches 1104, 1106, and 1108 may be monitored and the threshold levels of concurrent activity required to trigger their activation may be adjusted such that their activation frequencies approximate desired activation frequencies.

For example, if the desired activation frequency for a particular branch is 25%, but it is observed that the particular branch is activating less than 25% of the time, the threshold level of concurrent activity required to trigger the particular branch may be decreased. Similarly, if it is observed that the particular branch is activating more than 25% of the time, the threshold level of concurrent activity required to trigger the particular branch may be increased.

Consider branch 1104 and assume that the desired activation frequency for branch 1104 is 25%. Further assume that branch 1104 initially is configured to activate when four out of the eight inputs 1110(a), 1110(b), 1110(c), 1110(d), 1110(e), 1110(f), 1110(g), and 1110(h) that impinge branch 1104 are concurrently active. If it is observed that branch 1104 is activating less than 25% of the time, the number of concurrently active inputs required to trigger branch 1104 may be reduced. For example, the number of concurrently active inputs required to trigger branch 1104 may be reduced to three in response to observing that branch 1104 is activating less than 25% of the time.

Similarly, if it is observed that branch 1104 is activating more than 25% of the time, the number of concurrently active inputs required to trigger branch 1104 may be increased. For example, assuming again that branch 1104 initially is configured to activate when four out of the eight inputs 1110(a), 1110(b), 1110(c), 1110(d), 1110(e), 1110(f), 1110(g), and 1110(h) that impinge branch 1104 are concurrently active, the number of concurrently active inputs required to trigger branch 1104 may be increased to five in response to observing that branch 1104 is activating more than 25% of the time. In this manner, the threshold level of concurrent activity required to trigger branch 1104 may be continually regulated so that branch 1104 has a branch activation frequency that approximates 25%.

It should be noted that, in some implementations, the desired activation frequencies for the branches 1104, 1106, and 1108 may be the same, while, in other implementations, the desired activation frequencies for the branches 1104, 1106, and 1108 may be different.

Like the branches 1104, 1106, and 1108, the simulated cell body 1102 is configured to activate in response to some combination of concurrent activity in the branches 1104, 1106, and 1108. More particularly, the simulated cell body 1102 is configured to activate in response to a threshold level of concurrent activity in the branches 1104, 1106, and 1108.

In some implementations, the simulated cell body 1102 may be configured to activate in response to threshold numbers of branches being concurrently active (e.g., a threshold number of branches being active during a specified window of time). Additionally or alternatively, the simulated cell body 1102 may be configured to activate in response to a sum of concurrent activity levels in the branches 1104, 1106, and 1108 (e.g., a sum of the activity levels in the branches 1104, 1106, and 1108 during specified window of time) exceeding a threshold level. In such implementations, the sum of concurrent activity levels may be a straight linear sum of the concurrent activity levels in the branches 1104, 1106, and 1108 or the sum of concurrent activity levels in the branches 1104, 1106, and 1108 may be a weighted sum of the concurrent activity levels in the branches 1104, 1106, and 1108. For example, the branches 1104, 1106, and 1108 may be assigned various different weights, and the sum of the concurrent activity levels in the branches 1104, 1106, and 1108 may be calculated based on the weights assigned to the different branches 1104, 1106, and 1108. In other implementations, the simulated cell body 1102 may be configured to activate in response to a non-linear combination of concurrent activity in the branches 1104, 1106, and 1108 (e.g., a non-linear combination of activity in the branches 1104, 1106, and 1108 during specified windows of time) exceeding a threshold value.

The activation frequency of the simulated cell body 1102 is monitored and the threshold level of concurrent activity required to trigger activation is adjusted such that the cell body's activation frequency approximates a desired activation frequency.

Assume that the desired activation frequency for the simulated cell body 1102 is 25% and that the simulated cell body 1102 initially is configured to activate when two of the three branches 1104, 1106, and 1108 are concurrently active. If it is observed that the simulated cell body 1102 is activating less than 25% of the time, the number of active branches required to trigger the simulated cell body may be decreased to one. Similarly, if it is observed that the simulated cell body 1102 is activating more than 25% of the time, the number of concurrently active branches required to trigger the simulated cell body 1102 may be increased to three.

The regulation of the threshold levels of concurrent activity required to trigger the activation of the branches 1104, 1106, and 1108 and the regulation of the threshold levels of concurrent activity required to trigger the simulated cell body 1102 such that their activation frequencies approximate desired activation frequencies may be referred to as homeostatic thresholding because such regulation may function to achieve relatively stable (i.e., homeostatic) activation frequencies in the branches 1104, 1106, and 1108 and simulated cell body 1102.

Figure 12:
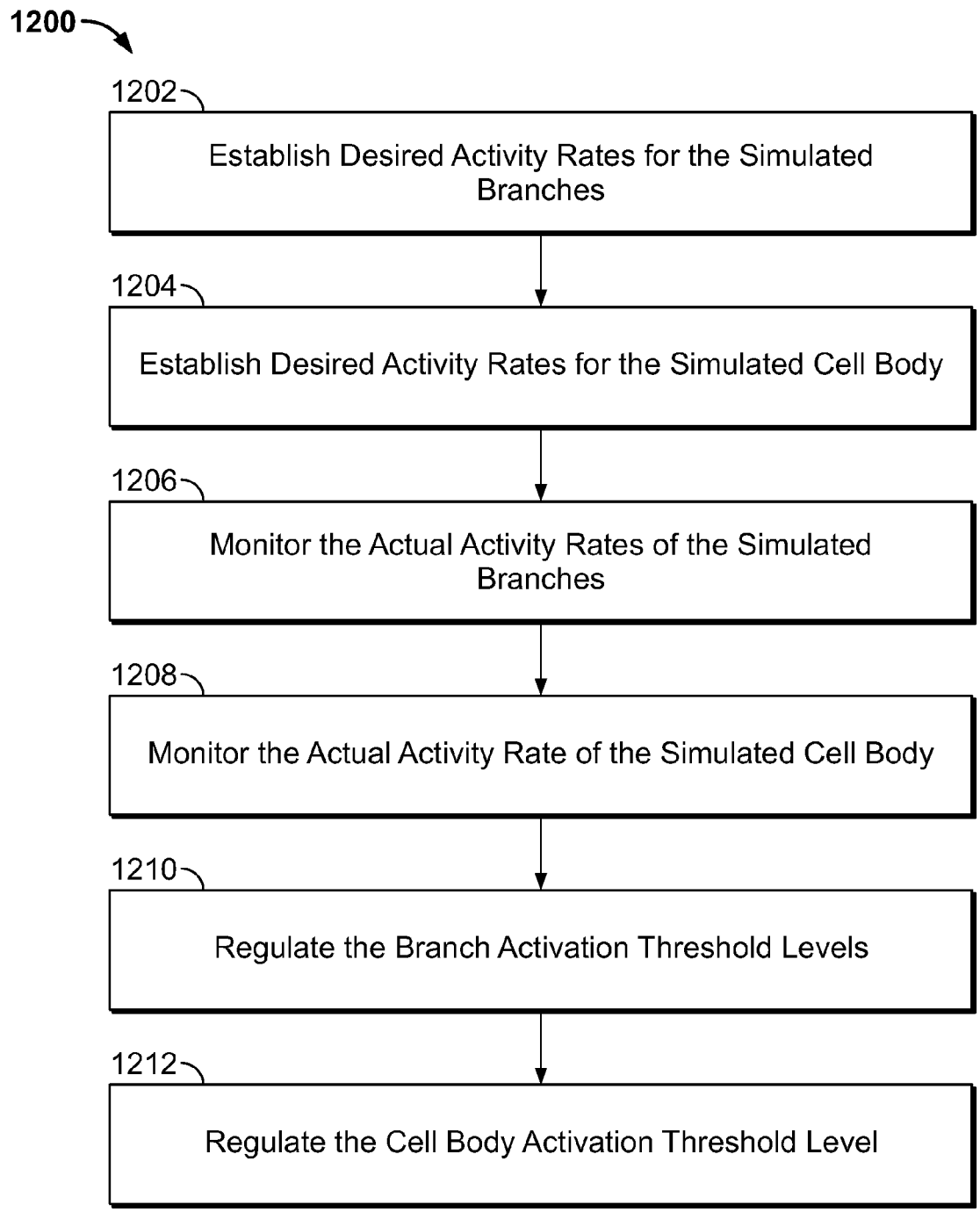
FIG. 12 is a flowchart of a process for homeostatically regulating threshold activity levels required to activate the branches and the simulated cell body of a simulated neural element.

FIG. 12 is a flowchart of a process 1200 for homeostatically regulating threshold activity levels required to activate the branches and the simulated cell body of a simulated neural element. As discussed above, the branches of a simulated neural element may be configured to activate in response to combinations of concurrent activity in the inputs that impinge the branches exceeding branch activation threshold levels. Similarly, the simulated cell body of a simulated neural element may be configured to activate in response to combinations of concurrent activity in the branches exceeding a cell body activation threshold level.

According to the process 1200, desired activity rates are established for the branches of the simulated neural element (1202). The desired activity rates may be the same for each branch or the desired activity rates may be different for each branch. In addition, a desired activity rate is established for the simulated cell body (1204).

Thereafter, as the simulated neural element is exposed to different sensory events, the actual activity rates of the branches are monitored (1206). In some implementations, monitoring the actual activity rates of the simulated neural element may include averaging activity in the branches over a period of time. In such implementations, relatively recent activity may be weighted more heavily than less recent activity when averaging activity in the branches. In addition, the actual activity rate of the simulated cell body also is monitored as the simulated neural element is exposed to different sensory events (1208). As with monitoring the actual activity rates of the branches, in some implementations, monitoring the actual activity rate of the simulated cell body may include averaging activity in the simulated cell body over a period of time. In such implementations, relatively recent activity may be weighted more heavily than less recent activity when averaging activity in the simulated cell body.

In addition, the branch activation threshold levels are regulated based on the actual activity rates of the branches in order to achieve actual branch activation rates that approximate the desired activity rates for the branches (1210). Similarly, the cell body activation threshold level is regulated based on the actual activity rate of the simulated cell body in order to achieve an actual cell body activation rate that approximates the desired activity rate for the simulated cell body (1212).

The systems and techniques described above are not limited to any particular hardware or software configuration. Rather, they may be implemented using hardware, software, or a combination of both. In addition, the methods and processes described may be implemented as computer programs that are executed on programmable computers comprising at least one processor and at least one data storage system. The computer programs may be implemented in a high-level compiled or interpreted programming language, or, additionally or alternatively, the computer programs may be implemented in assembly or other lower level languages, if desired. Such computer programs typically will be stored on computer-usable storage media or devices (e.g., CD-Rom, RAM, or magnetic disk). When read into a processor of a computer and executed, the instructions of the programs may cause a programmable computer to carry out the various operations described above.

A number of implementations have been described. Nevertheless, it will be understood that various modifications may be made. For example, useful results still may be achieved if aspects of the disclosed techniques are performed in a different order and/or if components in the disclosed systems are combined in a different manner and/or replaced or supplemented by other components. Accordingly, other implementations are within the scope of the following claims.

What is claimed is:

1. Computer hardware configured to implement a simulated neural element comprising:
  at least two branches, each branch being configured to:
    receive one or more input signals in response to sensory event occurrences, and
    activate in response to a combination of the input signals received during a first specified window of time exceeding a branch activation threshold level required to activate the branch; and
  a simulated cell body configured to activate in response to a combination of activity in the branches during a second specified window of time exceeding a cell body activation threshold level, wherein the simulated neural element is configured to:
    regulate the branch activation threshold levels such that some measures of the actual branch activation rates for the branches approximate desired branch activation rate measures; and
    regulate the cell body activation threshold level such that some measure of the actual cell body activation rate for the simulated cell body approximates a desired cell body activation rate measure.

2. The computer hardware implementing the simulated neural element of claim 1 wherein:
  the measure of the actual branch activation rate for a branch is a measure of branch activation frequency relative to a total number of sensory event occurrences during some preceding time period; and
  the measure of the actual cell body activation rate is a measure of cell body activation frequency relative to a total number of sensory event occurrences during some preceding time period.

3. The computer hardware implementing the simulated neural element of claim 2 wherein the desired branch activation rate measures are the same for all of the branches.

4. The computer hardware implementing the simulated neural element of claim 2 wherein the desired branch activation rate measures vary for the branches.

5. The computer hardware implementing the simulated neural element of claim 2 wherein each branch is coupled to a plurality of inputs and is configured to:
  receive input signals from the inputs to which the branch is coupled; and
  activate when some combination of concurrently received input signals from the inputs to which the branch is coupled exceeds the branch's branch activation threshold level.

6. The computer hardware implementing the simulated neural element of claim 5 wherein:
  the input signals received from the inputs are binary; and
  each branch is configured to activate when a weighted sum of the binary input signals received, during the first specified window of time, from the inputs to which the branch is coupled exceeds the branch's branch activation threshold level.

7. The computer hardware implementing the simulated neural element of claim 5 wherein:
the input signals received from the inputs reflect levels of activity; and
each branch is configured to activate when a sum of the input signals received, during the first specified window of time, from the inputs to which the branch is coupled exceeds the branch's branch activation threshold level.

8. The computer hardware implementing the simulated neural element of claim 7 wherein the sum of the input signals comprises a weighted sum of the input signals received, during the first specified window of time, from the inputs to which the branch is coupled.

9. The computer hardware implementing the simulated neural element of claim 7 wherein the sum of the input signals comprises a linear sum of the input signals received, during the first specified window of time, from the inputs to which the branch is coupled.

10. The computer hardware implementing the simulated neural element of claim 5 wherein each branch is configured to activate when a non-linear combination of the input signals received, during the first specified window of time, from the inputs to which the branch is coupled exceeds the branch's branch activation threshold level.

11. The computer hardware implementing the simulated neural element of claim 2 wherein:
the cell body activation threshold level is a threshold number of activated branches required to activate the cell body; and
the cell body is configured to activate in response to a number of activated branches of the simulated neural element during the second specified window of time exceeding the threshold number of activated branches required to activate the cell body.

12. The computer hardware implementing the simulated neural element of claim 2 wherein the simulated neural element is configured to:
increase a branch's branch activation threshold level when the measure of the branch's actual branch activation rate is greater than the branch's desired branch activation rate; and
decrease the branch's branch activation threshold level when the measure of the branch's actual branch activation rate is less than the branch's desired branch activation rate.

13. The computer hardware implementing the simulated neural element of claim 2 wherein the simulated neural element is configured to:
increase the cell body activation threshold level when the measure of the actual cell body activation rate is greater than the desired cell body activation rate; and
decrease the cell body activation threshold level when the measure of the actual cell body activation rate is less than the desired branch activation rate.

14. The computer hardware implementing the simulated neural element of claim 13 wherein:
the cell body activation threshold level is a threshold number of activated branches required to activate the cell body;
the simulated cell body is configured to activate in response to a number of activated branches of the simulated neural element during the second specified window of time exceeding the threshold number of activated branches required to activate the cell body; and
the simulated neural element is configured to:
increase the threshold number of activated branches required to activate the cell body when the measure of the actual cell body activation rate is greater than the desired cell body activation rate; and
decrease the threshold number of activated branches required to activate the cell body when the measure of the actual cell body activation rate is less than the desired branch activation rate.

15. The computer hardware implementing the simulated neural element of claim 1 wherein:
each branch is configured to regulate the branch's branch activation threshold level such that the measure of the actual branch activation rate for the branch approximate the branch's desired branch activation rate measure; and
the simulated cell body is configured to regulate the cell body activation threshold level such that the measure of the actual cell body activation rate for the simulated cell body approximates the desired cell body activation rate measure.

16. A method for regulating activity levels in a simulated branched neural element of a simulated neural circuit, the simulated branched neural element including at least two branches and a simulated cell body, each branch being configured to receive indications of input activity levels and to activate in response to combinations of the input activity levels exceeding a branch activation threshold level, the simulated cell body being configured to activate in response to combinations of activity in the branches exceeding a cell body activation threshold level, the method comprising:
establishing, using at least one computer, desired activity rates for the branches;
establishing, using the at least one computer, a desired activity rate for the simulated cell body;
monitoring, using the at least one computer, actual activity rates of the branches;
monitoring, using the at least one computer, an actual activity rate of the simulated cell body;
regulating, using the at least one computer, the branch activation threshold levels such that the actual activity rates of the branches approximate the desired activity rates for the branches; and
regulating, using the at least one computer, the cell body activation threshold level such that the actual activity rate of the simulated cell body approximates the desired activity rate for the simulated cell body.

17. The method of claim 16 wherein:
monitoring actual activity rates of the branches comprises averaging activity in the branches during a window in time; and
monitoring an actual activity rate of the simulated cell body comprises averaging activity in the simulated cell body during a window in time.

18. The method of claim 16 wherein:
averaging activity in the branches during a window in time includes weighting activity based on its recency relative to the window in time; and
averaging activity in the simulated cell body during a window in time includes weighting activity based on its recency relative to the window in time.

19. The method of claim 16 wherein:
the cell body activation threshold level comprises a number of activated branches required to activate the simulated cell body; and
the simulated cell body is configured to activate in response to a number of the simulated branched neural element's branches that are activated during a specified window of time exceeding the number of activated branches required to activate the simulated cell body.

20. The method of claim 16 wherein regulating a branch's branch activation threshold level comprises:
increasing the branch's branch activation threshold level when the branch's actual activity rate is greater than the branch's desired activity rate; and
decreasing the branch's branch activation threshold level when the branch's actual activity rate is less than the branch's desired activity rate.

21. The method of claim 16 wherein regulating the cell body activation threshold level comprises:
increasing the simulated cell body's activation threshold level when the simulated cell body's actual activity rate is greater than the desired activity rate for the simulated cell body; and
decreasing the simulated cell body's activation threshold level when the simulated cell body's actual activity rate is less than the desired activity rate for the simulated cell body.

22. The method of claim 21 wherein:
the cell body activation threshold level comprises a number of activated branches required to activate the simulated cell body;
the simulated cell body is configured to activate in response to a number of the simulated branched neural element's branches that are activated during a specified window of time exceeding the number of activated branches required to activate the simulated cell body; and
regulating the cell body activation threshold level comprises:
increasing the number of activated branches required to activate the simulated cell body when the simulated cell body's actual activity rate is greater than the desired activity rate for the simulated cell body, and
decreasing the number of activated branches required to activate the simulated cell body when the simulated cell body's actual activity rate is less than the desired activity rate for the simulated cell body.

23. A computer program for regulating activity levels in a simulated branched neural element of a simulated neural circuit, the simulated branched neural element including at least two branches and a simulated cell body, each branch being configured to receive indications of input activity levels and to activate in response to combinations of the input activity levels exceeding a branch activation threshold level, the simulated cell body being configured to activate in response to combinations of activity in the branches exceeding a cell body activation threshold level, the computer program being embodied on a tangible computer-readable medium and including instructions that, when executed, cause a computer to:
establish desired activity rates for the branches;
establish a desired activity rate for the simulated cell body;
monitor actual activity rates of the branches;
monitor an actual activity rate of the simulated cell body;
regulate the branch activation threshold levels such that the actual activity rates of the branches approximate the desired activity rates for the branches; and
regulate the cell body activation threshold level such that the actual activity rate of the simulated cell body approximates the desired activity rate for the simulated cell body.

24. The computer program of claim 23 wherein:
the instructions that, when executed, cause a computer to monitor actual rates of the branches comprise instructions that, when executed, cause a computer to average activity in the branches during a window in time; and
the instructions that, when executed, cause a computer to monitor an actual activity rate of the simulated cell body comprise instructions that, when executed, cause a computer to average activity in the simulated cell body during a window in time.

25. The computer program of claim 23 wherein:
the cell body activation threshold level comprises a number of activated branches required to activate the simulated cell body; and
the simulated cell body is configured to activate in response to a number of the simulated branched neural element's branches that are activated during a specified window of time exceeding the number of activated branches required to activate the simulated cell body.

26. The computer program of claim 23 wherein the instructions that, when executed, cause a computer program to regulate a branch's branch activation threshold level comprise instructions that, when executed, cause a computer to:
increase the branch's branch activation threshold level when the branch's actual activity rate is greater than the branch's desired activity rate; and
decrease the branch's branch activation threshold level when the branch's actual activity rate is less than the branch's desired activity rate.

27. The computer program of claim 23 wherein the instructions that, when executed, cause a computer to regulate the cell body activation threshold level comprise instructions that, when executed, cause a computer to:
increase the simulated cell body's activation threshold level when the simulated cell body's actual activity rate is greater than the desired activity rate for the simulated cell body; and
decrease the simulated cell body's activation threshold level when the simulated cell body's actual activity rate is less than the desired activity rate for the simulated cell body.

28. The computer program of claim 23 wherein:
the cell body activation threshold level comprises a number of activated branches required to activate the simulated cell body;
the simulated cell body is configured to activate in response to a number of the simulated branched neural element's branches that are activated during a specified window of time exceeding the number of activated branches required to activate the simulated cell body; and
the instructions that, when executed, cause a computer to regulate the cell body activation threshold level comprise instructions that, when executed, cause a computer to:
increase the number of activated branches required to activate the simulated cell body when the simulated cell body's actual activity rate is greater than the desired activity rate for the simulated cell body, and
decrease the number of activated branches required to activate the simulated cell body when the simulated cell body's actual activity rate is less than the desired activity rate for the simulated cell body.

* * * * *